(12) United States Patent
Davies et al.

(10) Patent No.: US 7,084,782 B2
(45) Date of Patent: Aug. 1, 2006

(54) DRILL STRING TELEMETRY SYSTEM AND METHOD

(75) Inventors: Evan L. Davies, Spring, TX (US); Edward James Cargill, Sherwood Park (CA); Gary L. Donison, Sherwood Park (CA); Boguslaw Wiecek, Leduc (CA); Daniel P. Lupien, Edmonton (CA); Richard D. Bottos, Hockley, TX (US); Richard T. Hay, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 750 days.

(21) Appl. No.: 10/326,388

(22) Filed: Dec. 23, 2002

(65) Prior Publication Data

US 2004/0119607 A1 Jun. 24, 2004

(51) Int. Cl.
*G08C 19/00* (2006.01)

(52) U.S. Cl. ............................... 340/854.4; 340/854.3; 340/855.1; 175/26

(58) Field of Classification Search ............. 340/854.4, 340/854.3, 855.1, 853.1, 854.5; 175/26, 175/45, 61, 40, 107, 75
See application file for complete search history.

(56) References Cited

U.S. PATENT DOCUMENTS

| | | |
|---|---|---|
| 3,170,137 A | 2/1965 | Brandt |
| 3,696,332 A | 10/1972 | Dickson, Jr. et al. |
| 3,823,787 A | 7/1974 | Haworth et al. |
| 4,012,092 A | 3/1977 | Godbey |
| 4,057,781 A | 11/1977 | Scherbatskoy |
| 4,431,964 A | 2/1984 | Walkow |
| 4,496,174 A | 1/1985 | McDonald et al. |
| 4,529,939 A | 7/1985 | Kuckes |
| 4,605,268 A | 8/1986 | Meador |
| 4,691,203 A | 9/1987 | Rubin et al. |
| 4,722,402 A | 2/1988 | Weldon |
| 4,725,837 A | 2/1988 | Rubin |

(Continued)

FOREIGN PATENT DOCUMENTS

CA 2298375 9/2000

(Continued)

OTHER PUBLICATIONS

Abyzbayev, B.I. et al., "Electrodrilling: Past Experience and Present Opportunities," Society of Petroleum Engineers SPE 38624, pp. 573-588.

(Continued)

*Primary Examiner*—Michael Horabik
*Assistant Examiner*—Hung Q. Dang
(74) *Attorney, Agent, or Firm*—Terrence N. Kuharchuk; William Shull; Michael D. McCully

(57) ABSTRACT

A telemetry system and method for communicating information axially along a drill string comprised of a drive train supported within a housing. The system includes an axial conducting loop formed by the drill string for conducting an axial electrical signal embodying the information between a first axial position and a second axial position in the drill string, which axial conducting loop extends between the first and second axial positions. A transmitter transmits information to the axial conducting loop. The drive train includes a downhole end which extends from and is located below the housing. At least one of the first and second axial positions is located in the downhole end. The method includes the step of conducting the axial electrical signal between the first and second axial positions through the axial conducting loop which extends between the first and second axial positions.

66 Claims, 12 Drawing Sheets

U.S. PATENT DOCUMENTS

| | | |
|---|---|---|
| 4,899,834 A | 2/1990 | Weldon |
| 5,018,590 A | 5/1991 | Weldon |
| 5,034,929 A | 7/1991 | Cobern et al. |
| 5,060,737 A | 10/1991 | Mohn |
| 5,139,094 A | 8/1992 | Prevedel et al. |
| 5,160,925 A | 11/1992 | Dailey et al. |
| 5,163,521 A | 11/1992 | Pustanyk et al. |
| 5,314,030 A | 5/1994 | Peterson et al. |
| 5,359,324 A | 10/1994 | Clark et al. |
| 5,410,303 A | 4/1995 | Comeau et al. |
| 5,602,541 A | 2/1997 | Comeau et al. |
| 6,158,529 A | 12/2000 | Dorel |
| 6,244,361 B1 | 6/2001 | Comeau et al. |
| 6,269,892 B1 | 8/2001 | Boulton et al. |
| 6,392,561 B1 | 5/2002 | Davies et al. |
| 6,446,736 B1 | 9/2002 | Kruspe et al. |
| 6,464,011 B1 * | 10/2002 | Tubel ..................... 166/313 |
| 2002/0113716 A1 | 8/2002 | Aiello |

FOREIGN PATENT DOCUMENTS

| | | |
|---|---|---|
| EP | 0 540 425 B1 | 5/1993 |
| EP | 0718641 A2 | 6/1996 |
| GB | 2177738 | 1/1987 |
| GB | 2307537 | 5/1997 |
| WO | WO 92/18882 | 10/1992 |
| WO | WO 00/61916 | 10/2000 |

OTHER PUBLICATIONS

Sperry-Sun Drilling Services, Inc., catalogue entitled "Sourcebook," 1996, pp. 33-44 ("Measurement-While-Drilling -Systems").

Sperry-Sun Drilling Services, Inc., "Sperry Drill Technical Information Handbook," undated, pp. 2-17.

* cited by examiner

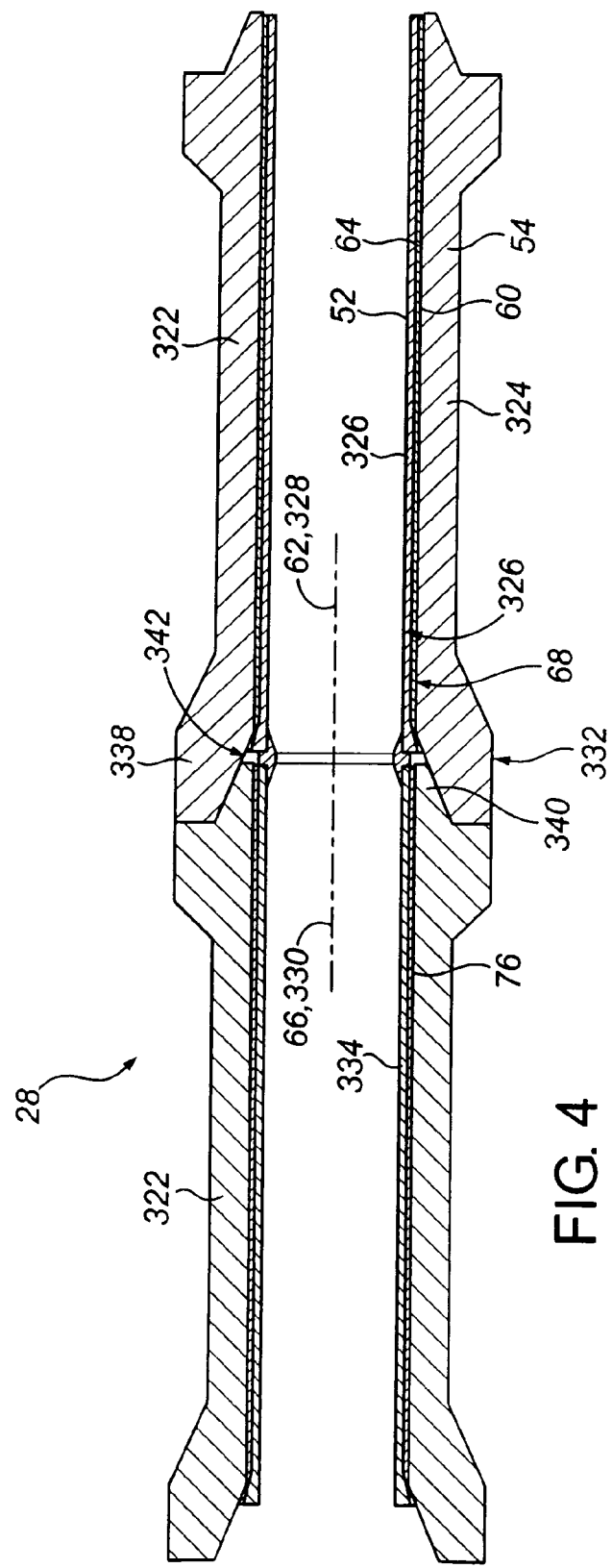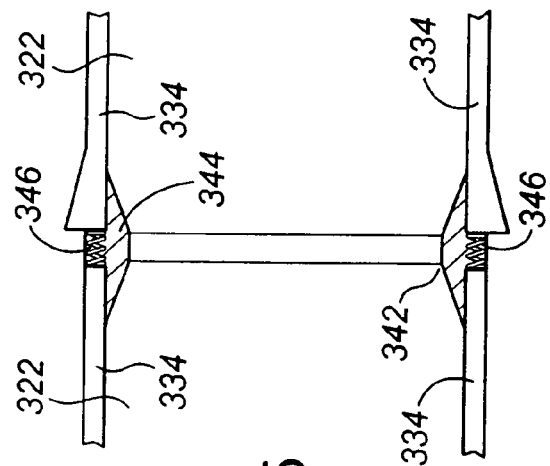

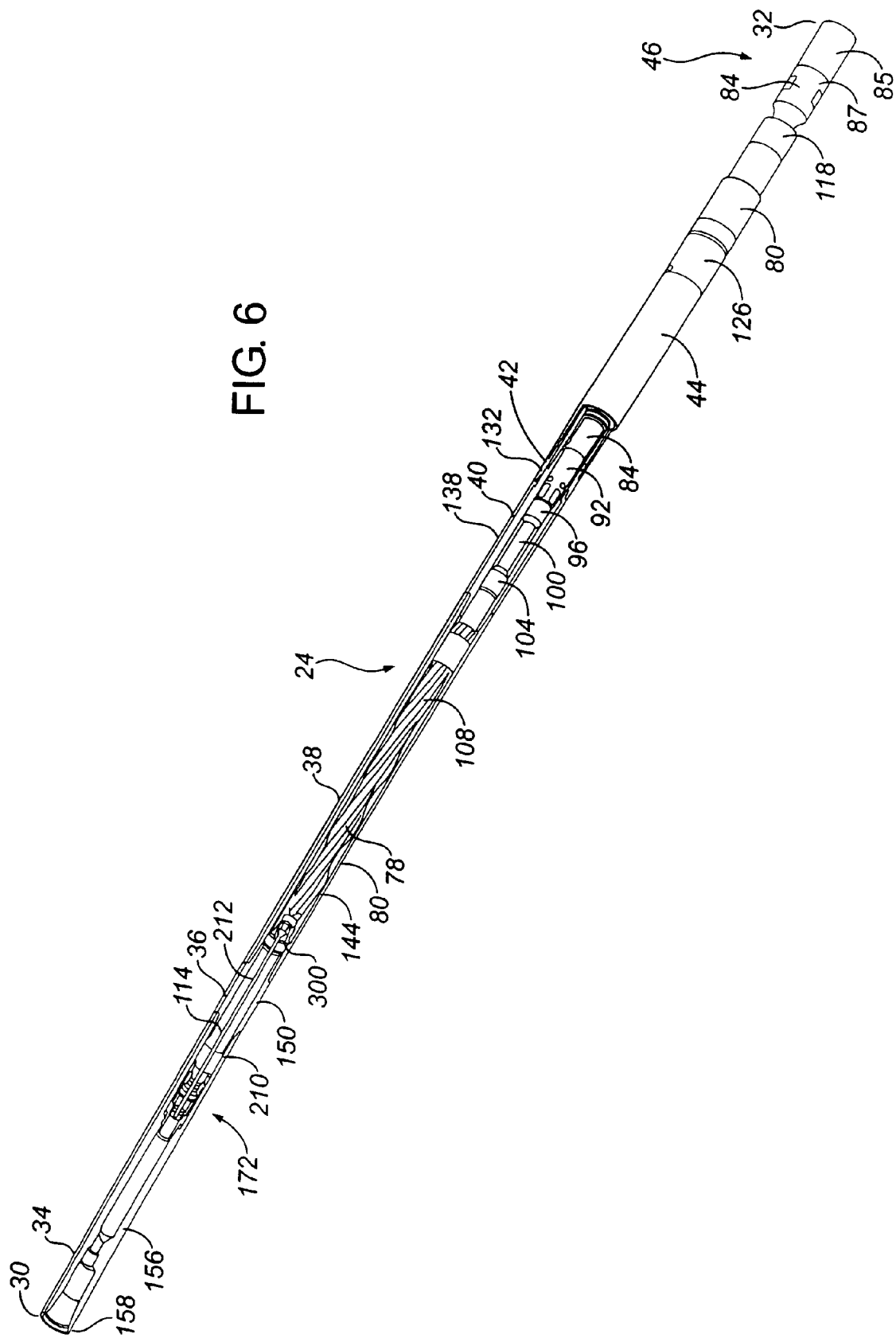

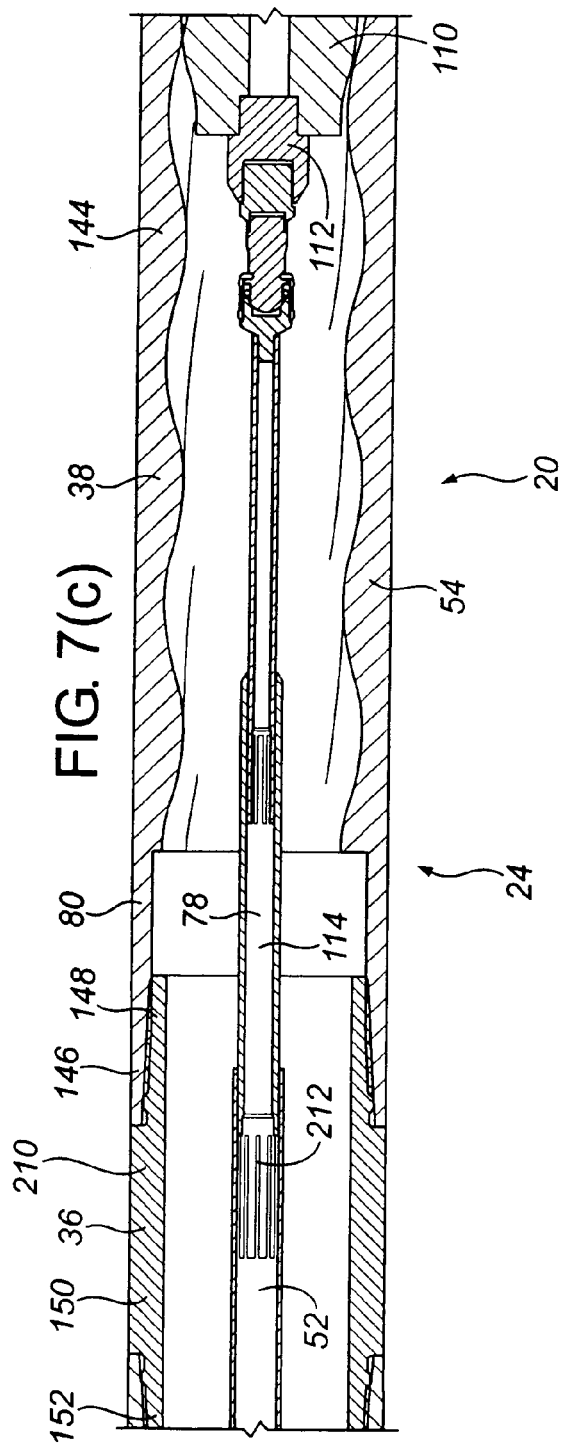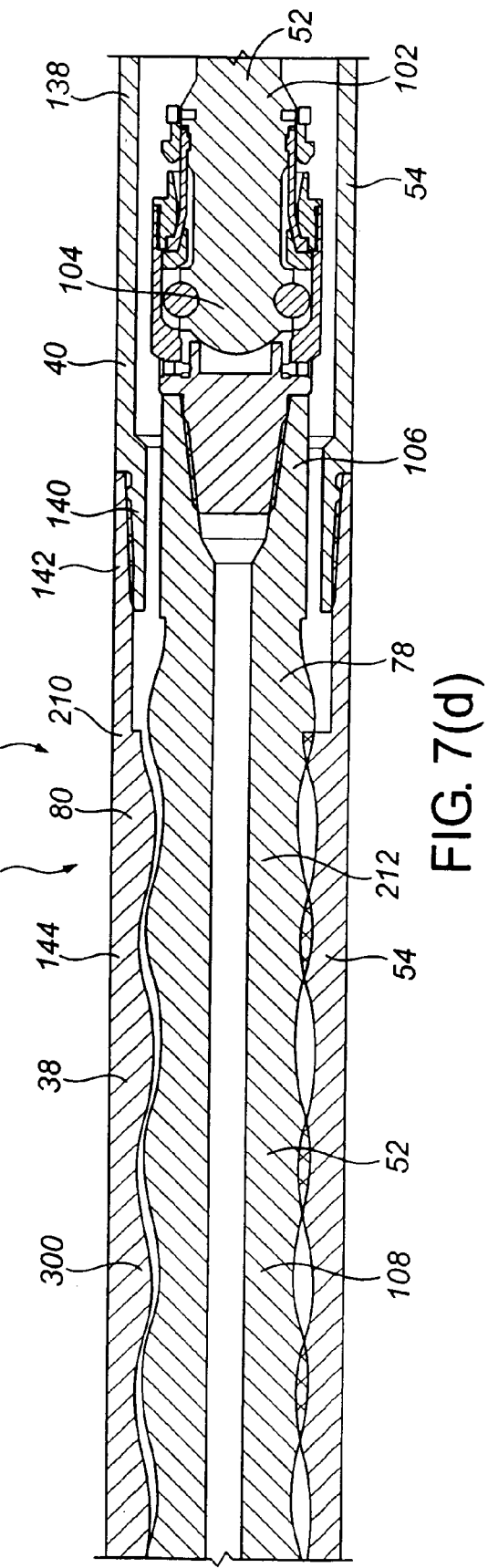

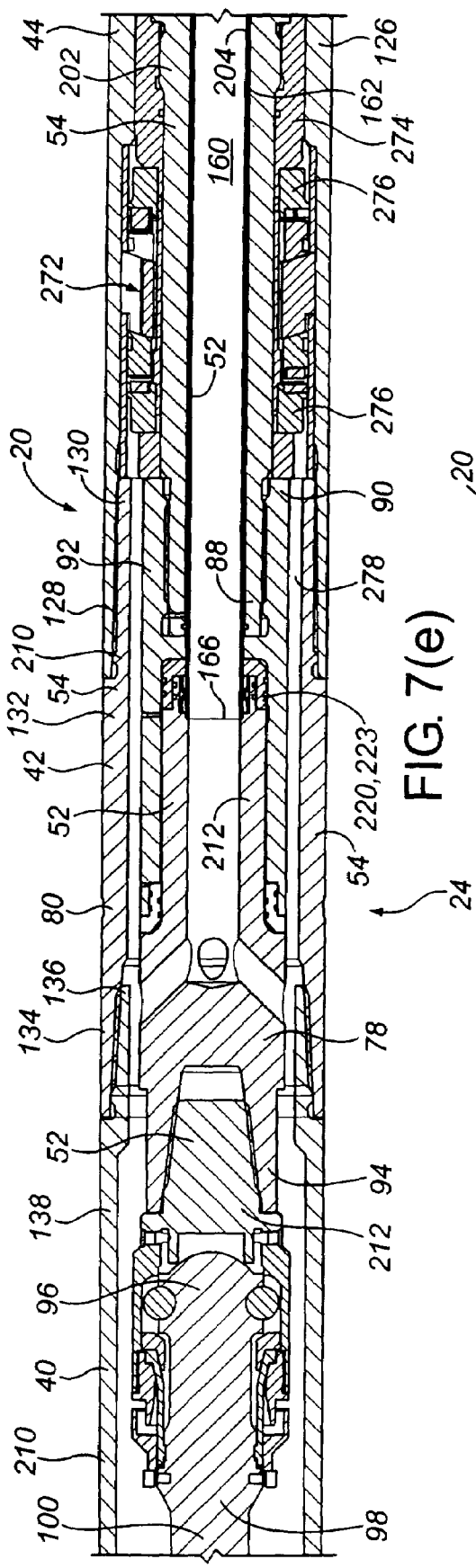
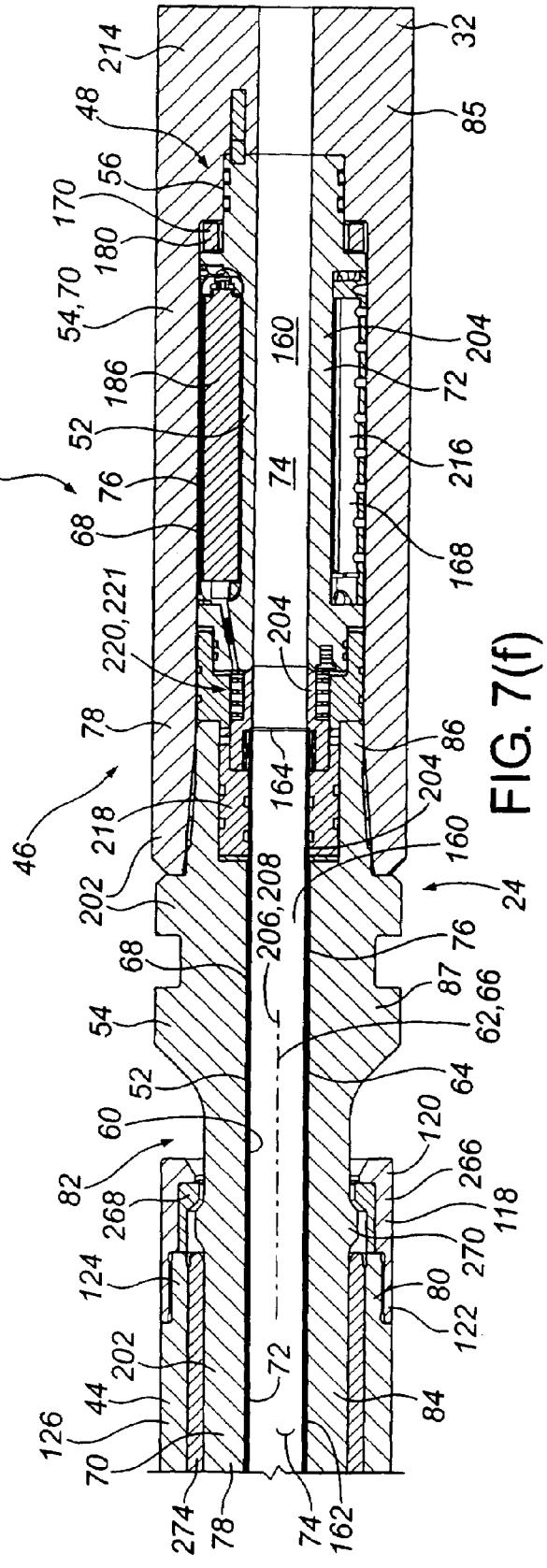

DRILL STRING TELEMETRY SYSTEM AND METHOD

FIELD OF INVENTION

The present invention relates to a downhole data and power transmission or telemetry system and method for communicating information axially along a drill string. More particularly, the present invention relates to a system and method for communicating information unidirectionally or bidirectionally through an axial conducting loop comprised of the drill string.

BACKGROUND OF INVENTION

Directional drilling involves controlling the direction of a borehole as it is being drilled. Since boreholes are drilled in three dimensional space, the direction of a borehole includes both its inclination relative to vertical as well as its azimuth. Usually the goal of directional drilling is to reach a target subterranean destination with the drill string, typically a potential hydrocarbon producing formation.

In order to optimize the drilling operation and wellbore placement, it is often desirable to be provided with information concerning the environmental conditions of the surrounding formation being drilled and information concerning the operational and directional parameters of the drill string including the downhole motor drilling assembly and the drill bit assembly. For instance, it is often necessary to adjust the direction of the borehole frequently while directional drilling, either to accommodate a planned change in direction or to compensate for unintended and unwanted deflection of the borehole. In addition, it is desirable that the information concerning the environmental, directional and operational parameters of the drilling operation be provided to the operator on a real time basis. The ability to obtain real time data measurements while drilling permits a relatively more economical and more efficient drilling operation.

For example, the performance of the downhole motor drilling assembly, and in particular the downhole motor, and the life of the downhole motor may be optimized by the real time transmission of the temperature of the downhole motor bearings or the rotations per minute of the drive shaft of the motor. Similarly, the drilling operation itself may be optimized by the real time transmission of environmental or borehole conditions such as the measurement of natural gamma rays, borehole inclination, borehole pressure, resistivity of the formation and weight on bit. Real time transmission of this information permits real time adjustments in the operating parameters of the downhole motor drilling assembly and real time adjustments to the drilling operation itself.

Accordingly, various systems have been developed that permit downhole sensors to measure real time drilling parameters and to transmit the resulting information or data to the surface substantially instantaneously with the measurements. For instance, mud pulse telemetry systems transmit signals from an associated downhole sensor to the surface through the drilling mud in the drill string. More particularly, pressure, modulated with the sensed information from the downhole sensor, applied to the mud column is received and demodulated at the surface. The downhole sensor may include various sensors such as gamma ray, resistivity, porosity or temperature sensors for measuring formation characteristics or other downhole parameters. In addition, the downhole sensor may include one or more magnetometers, accelerometers or other sensors for measuring the direction or inclination of the borehole, weight-on-bit or other drilling parameters.

Typically, these systems, such as the mud pulse telemetry system, are located above the downhole motor drilling assembly. For instance, when used with a downhole motor, the mud pulse telemetry system is typically located above the motor so that it is spaced a substantial distance from the drilling bit in order to protect or shield the electronic components of the system from the effects of any vibration or centrifugal forces emanating from the drilling bit. Further, the downhole sensors associated with the system are typically placed in a non-magnetic environment by utilizing monel collars in the drill string below the system.

Thus, the telemetry system and the sensors may be located a significant distance from the drilling bit. As a result, the environmental information measured by the system may not necessary correlate with the actual conditions surrounding the drilling bit. Rather, the system is responding to conditions which are substantially spaced from the drilling bit. For instance, a conventional telemetry system may have a depth lag of up to or greater than 60 feet. As a result of this information delay, it is possible to drill out of a hydrocarbon producing formation before detecting the exit, resulting in the need to drill several meters of borehole to get back into the pay zone. The interval drilled outside of the pay zone results in costly lost production over that interval over the life of the well. In some instances this represents millions of dollars in lost production revenue to the operator, not to mention the wasted cost of putting completion equipment over that non-producing interval to reach producing zones further down in the well.

Other difficulties arise with the lag in the sensor to drill bit distance in deciding when it is appropriate to stop drilling and run casing in the borehole. This is often driven by formation characteristics. As well, it is desirable to set a casing section in or before certain formations to avoid further drilling or production problems later on.

In response to this undesirable information delay or depth lag, various near bit sensor systems or packages have been developed which are designed to be placed adjacent or near the drilling bit. The near bit system provides early detection of changes to the formation while drilling, minimizing the need for lengthy corrective drilling intervals and service costs. The drilling operation, including the trajectory of the drilling bit, may then be adjusted in response to the sensed information. However, such near bit sensors continue to be located a spaced distance from the drill bit assembly which still introduces a lag in determining formation changes. In addition, packaging sensors in a mud motor tends to be very costly and may reduce the reliability of the system because the cross section of the motor must now share mechanical power transmission and fluid flow to the bit with space for sensors and supporting electronics.

Further, in order to use a near bit sensor system and permit real time monitoring and adjustment of drilling parameters, a system or method must be provided for transmitting the measured data or sensed information from the downhole sensor either directly to the surface or to a further telemetry system, typically a long haul system, for subsequent transmission to the surface. Similarly, a system or method may need to be provided for transmitting the required electrical power to the downhole sensor system from the surface or some other power source. Various attempts have been made in the prior art to transmit information and/or power directly or indirectly between a downhole location and the surface. However, none of these attempts have provided a fully satisfactory solution.

For instance, various systems have been developed for communicating or transmitting the information directly to the surface through an electrical line, wireline or cable to the surface. These hard-wire connectors provide a hard-wire connection from near the drilling bit to the surface, which has a number of advantages. For instance, these connections typically permit data transmission at a relatively high rate and permit two-way or bidirectional communication. However, these systems also have several disadvantages.

First, a wireline or cable must be installed in or otherwise attached or connected to the drill string. This wireline or cable is subject to wear and tear during use and thus, may be prone to damage or even destruction during normal drilling operations. The drilling assembly may not be particularly suited to accommodate such wirelines, with the result that the wireline sensors may not be able to be located in close proximity to the drilling bit. Further, the wireline may be exposed to excessive stresses at the point of connection between the sections of drill pipe comprising the drill string. As a result, the system may be somewhat unreliable and prone to failure. In addition, the presence of the wireline or cable may require a change in the usual drilling equipment and operational procedures. The drilling assembly may need to be particularly designed to accommodate the wireline. As well, the wireline may need to be withdrawn and replaced each time a joint of pipe is added to the drill string. Finally, there may be a need for through-bore access through the drill string for particular equipment or operations.

Systems have also been developed for the transmission of acoustic or seismic signals or waves through the drill string or surrounding formation. The acoustic or seismic signals are generated by a downhole acoustic or seismic generator. However, a relatively large amount of power is typically required downhole in order to generate a sufficient signal such that it is detectable at the surface. A relatively large power source must be provided downhole or repeaters used at intervals along the string to boost the signal as it propagates along the drill string.

U.S. Pat. No. 5,163,521 issued Nov. 17, 1992 to Pustanyk et. al., U.S. Pat. No. 5,410,303 issued Apr. 25, 1995 to Comeau et. al., and U.S. Pat. No. 5,602,541 issued Feb. 11, 1997 to Comeau et. al. all describe a telemetry tool, a downhole motor having a bearing assembly and a drilling bit. A sensor and a transmitter are provided in a sealed cavity within the housing of the downhole motor adjacent the drilling bit. A signal from the sensor is transmitted by the transmitter to a receiver in the long haul telemetry tool, which then transmits the information to the surface. The signals are transmitted from the transmitter to the receiver by a wireless system. Specifically, the information is transmitted by frequency modulated acoustic signals indicative of the sensed information. Preferably, the transmitted signals are acoustic signals having a frequency in the range below 5000 Hz.

Further systems have been developed which require the transmission of electromagnetic signals through the surrounding formation. Electromagnetic transmission of the sensed information often involves the use of a toroid positioned adjacent the drilling bit for generation of an electromagnetic wave through the formation. Specifically, a primary winding, carrying the sensed information, is wrapped around the toroid and a secondary winding is formed by the drill string. A receiver may be either connected to the ground at the surface for detecting the electromagnetic wave or may be associated with the drill string at a position uphole from the transmitter.

Generally speaking, as with acoustic and seismic signal transmission, the transmission of electromagnetic signals through the formation typically requires a relatively large amount of power, particularly where the electromagnetic signal must be detectable at the surface. Further, attenuation of the electromagnetic signals as they are propagated through the formation is increased with an increase in the distance over which the signals must be transmitted, an increase in the data transmission rate and an increase in the electrical resistivity of the formation. The conductivity and the heterogeneity of the surrounding formation may particularly adversely affect the propagation of the electromagnetic radiation through the formation. Thus, a relatively large power source is needed downhole to provide the energy required to effect successful telemetry.

Finally, there are typically two methods for creating an electromagnetic antenna downhole. When utilizing a toroid for the transmission of the electromagnetic signal, the outer sheath of the drill string must protect the windings of the toroid while still providing structural integrity to the drill string. This is particularly important given the location of the toroid in the drill string since the toroid is often exposed to large mechanical stresses during the drilling operation and is very bulky. The toroid creates a virtual insulative gap or electrical discontinuity in the drill string thereby allowing an electrical potential bias to be generated. The second method is to mechanically create an electrical discontinuity in the drill string. The electrical discontinuity typically comprises an insulative gap or insulated zone provided in the drill string. Such a mechanism is documented in U.S. Pat. No. 4,691,203 issued Sep. 1, 1987 to Rubin et. al. The insulative gap may be provided by an insulating material comprising a substantial area of the outer sheath or surface of the drill string. For instance, the insulating material may extend for ten to thirty feet along the drill string or only an inch or two. Regardless, the need for the insulative gap to be incorporated into the drill string may interfere with the structural integrity of the drill string resulting in a weakening of the drill string at the gap. Further, the insulating material provided for the insulative gap may be readily damaged during typical drilling operations.

Various attempts have been made in the prior art to address these difficulties or disadvantages associated with electromagnetic transmission systems. However, none of these attempts have provided a fully satisfactory solution as each continues to require the propagation of an electromagnetic signal through the formation. Examples include: U.S. Pat. No. 4,496,174 issued Jan. 29, 1985 to McDonald et. al.; U.S. Pat. No. 4,725,837 issued Feb. 16, 1988 to Rubin; U.S. Pat. No. 4,691,203 issued Sep. 1, 1987 to Rubin et. al.; U.S. Pat. No. 5,160,925 issued Nov. 3, 1992 to Dailey et. al.; PCT International Application PCT/US92/03183 published Oct. 29, 1992 as WO 92/18882; U.S. Pat. No. 5,359,324 issued Oct. 25, 1994 to Clark et. al. and European Patent Specification EP 0 540 425 B1 published Sep. 25, 1996.

Finally, U.S. Pat. No. 6,392,561 issued May 21, 2002 to Davies et. al. provides a short hop telemetry system for transmitting an axial electrical signal embodying information generated from a downhole sensor across the power unit of a downhole motor drilling assembly. However, the configuration of this system requires the sensor to be positioned or located within the housing of the drilling assembly. Thus, this system does not provide for the placement of the sensor in, or the transmission of an axial electrical signal from, a downhole end of a drive train of the drilling assembly below the housing.

Therefore, there remains a need in the industry for a data or power transmission or telemetry system and method for communicating information axially along a drill string. Further, there is a need for a telemetry system and method that communicate or transmit data measurements, sensed information or power through components of the drill string. Still further, there is a need for the downhole telemetry system and method to communicate information and/or power either unidirectionally or bidirectionally axially along or through the drill string.

As well, there is a need for a telemetry system and method that can communicate through components of a drive train comprising the drill string, and preferably, through components of a drill bit assembly comprising the drive train. Finally, the system and method preferably communicate information provided by at least one sensor located in the drive train, and preferably located in the drill bit assembly.

SUMMARY OF INVENTION

The present invention relates to a data transmission or telemetry system and a method for communicating information axially along a drill string. The present system and method may also be utilized for transmitting electrical power along the drill string, for instance, to provide power to a downhole tool such as any of the components of a downhole drilling assembly. Therefore, any reference contained herein to the communication of information axially along the drill string is intended to include and encompass the use of the system or method for the transmission or communication of electrical power along the drill string.

Further, although the preferred embodiment communicates information or transmits electrical power axially along a drill string, the system and method are equally applicable to a casing string or other pipe string suitable for placement within a borehole, including expandable casing or other expandable pipe. Therefore, any reference contained herein to the drill string is intended to include and encompass the use of the system or method for a casing string or other downhole pipe string.

Further, the present invention relates to a downhole real time telemetry system and a method, which may be used alone or in conjunction with one or more further drill string communication systems, such as any known downhole measurement-while-drilling (MWD) systems, for communicating information axially along or through the drill string.

The drill string as described herein extends between the ground surface or uphole end of the drill string and the drill bit or downhole end of the drill string. The telemetry system and method may be utilized to communicate the information axially along or through any portion of the length of the drill string between the ground surface and the drill bit. Preferably, the system and method are capable of communicating the information unidirectionally or bidirectionally through the drill string.

Further, at least one axial conducting loop is preferably formed by the drill string for conducting an axial electrical signal embodying the information between a first axial position in the drill string and a second axial position in the drill string, which axial conducting loop extends between the first and second axial positions. However, where desired, greater than one axial conducting loop may be provided. For instance, a plurality of axial conducting loops may be electrically connected together in series to conduct the axial electrical signal along the desired length of the drill string.

Alternately, a plurality of axial conducting loops, each communicating different information, on one or a plurality of different frequency channels, using one or a plurality of modulation schemes, or power, may extend along the drill string in parallel to each other. In this case, a plurality of parallel circuits will be provided by the drill string for transmitting a plurality of axial electrical signals. Where a plurality of parallel axial conducting loops is used, the axial conducting loops may be arranged in any configuration relative to each other. For instance, the axial conducting loops may be spaced about the circumference or perimeter of the drill string. Alternately, each axial conducting loop may extend substantially about the circumference or perimeter of the drill string, wherein the axial conducting loops are layered upon each other.

As well, the telemetry system and method preferably permit communication along or through any of the components of the drill string along its length. For instance, where the drill string is comprised of a drive train supported within a housing, the system and method preferably permit communication of the information axially along or through at least a portion of the drive train. In the preferred embodiment, the drive train is comprised of a downhole end, wherein the downhole end of the drive train extends from and is located below the housing. In this instance, the information is communicated axially along or though at least a portion of the downhole end of the drive train.

Preferably, the within invention provides for a relatively high data transmission rate and relatively low power consumption as compared to known systems and methods. Given that the information is communicated along the drill string, the communication of the information does not tend to be significantly affected by the conductance or resistance of the surrounding formation, drilling mud or other drilling fluids because the resistance of the conductive metallic paths the signal travels in the drill sting is substantially lower than the surrounding formation and mud system. Electrical current travels primarily on the path of least resistance. For the same reason, the drill string is not required to provide an insulative gap therein because there are two electrical paths in the drill string instead of just one, as is the case with electromagnetic technology where the formation acts as one conductor and the drill string acts as the second conductor.

In a first aspect of the invention, the invention is comprised of a telemetry system for communicating information axially along a drill string, the drill string being comprised of a drive train supported within a housing, the system comprising:

(a) an axial conducting loop formed by the drill string for conducting an axial electrical signal embodying the information between a first axial position in the drill string and a second axial position in the drill string, which axial conducting loop extends between the first axial position and the second axial position; and (b) a transmitter for transmitting information to the axial conducting loop;

wherein the drive train is comprised of a downhole end, wherein the downhole end of the drive train extends from and is located below the housing, and wherein at least one of the first axial position and the second axial position is located in the downhole end of the drive train.

In a second aspect of the invention, the invention is comprised of a telemetry system for communicating information axially along a drill string, the system comprising:

(a) an axial conducting loop formed by the drill string for conducting an axial electrical signal embodying the information between a first axial position in the drill string and a second axial position in the drill string, which axial conducting loop extends between the first axial position and the second axial position;

(b) at least a portion of the drill string between the first axial position and the second axial position comprising:

(i) an outer axial conductor having an inner circumferential surface defining an outer conductor longitudinal axis;

(ii) an inner axial conductor having an outer circumferential surface defining an inner conductor longitudinal axis, wherein the inner axial conductor is fixedly connected within the outer axial conductor such that an annular space is defined between the outer circumferential surface and the inner circumferential surface, wherein the outer conductor longitudinal axis and the inner conductor longitudinal axis are substantially coincidental and wherein at least a portion of the axial conducting loop is comprised of the outer axial conductor and the inner axial conductor; and (iii) an electrical insulator disposed within the annular space; and (c) a transmitter for transmitting information to the axial conducting loop.

In the second aspect, the drill string is preferably comprised of a drive train supported within a housing. Further, preferably, the drive train is comprised of a downhole end, wherein the downhole end of the drive train extends from and is located below the housing, and wherein at least one of the first axial position and the second axial position is located in the downhole end of the drive train.

Actuation of the drive train results in the drilling of a borehole by the drill string through the surrounding formation. Accordingly, the drive train is defined herein to include any component or element of the drill string which, when actuated, results in or causes the drilling operation to proceed.

The drive train is supported within a housing, preferably movably supported within the housing, such that the drive train may be actuated within the housing. In other words, the drive train is preferably movable relative to the housing. More particularly, in a reciprocating drill system, the drive train is reciprocably supported within the housing such that actuation of the drive train to reciprocate within the housing drives a hammer bit or reciprocating drill bit comprising the drive train in order to drill the borehole. In a rotating drill system, as preferred herein, the drive train is rotatably supported within the housing. Accordingly, actuation of the drive train to rotate within the housing drives a rotating drill bit comprising the drive train in order to drill the borehole.

As stated, the drive train is preferably comprised of a downhole end, wherein the downhole end of the drive train preferably extends from and is located below the housing. Further, at least one of the first axial position and the second axial position is preferably located in the downhole end of the drive train. In other words, at least a portion of the axial conducting loop is comprised of the downhole end of the drive train.

The drive train, including the downhole end, may be comprised of a single integral component or member or it may be comprised of two or more components or members either permanently or removably affixed or connected together in any suitable manner such as by welding or threaded connections therebetween. As indicated, actuation of the drive train causes the drilling operation to proceed.

For instance, the downhole end of the drive train may be comprised of a drive shaft and wherein at least a portion of the axial conducting loop is comprised of the drive shaft. Thus, at least one of the first and second axial positions may be located in the drive shaft. Alternately, neither of the first and second axial positions may be located in the drive shaft. Rather, the first and second axial positions may be located in the drill string such that the axial conducting loop simply extends through the drive shaft.

In the preferred embodiment, the downhole end of the drive train is comprised of a drill bit assembly and wherein at least a portion of the axial conducting loop is comprised of the drill bit assembly. Further, one of the first axial position and the second axial position is preferably located in the drill bit assembly.

In the preferred embodiment, the drill bit assembly is operatively connected or mounted with a downhole end of the drive shaft such that actuation of the drive shaft drives the drill bit assembly. The drill bit assembly is comprised of a drill bit for drilling the borehole. The drill bit defines the downhole end of the drill string.

In addition, the drill bit assembly may be comprised of one or more further components or elements associated with the drill bit and located between the drive shaft and the drill bit. For instance, the drill bit assembly may be further comprised of a sub or member connected between the drive shaft and the drill bit. The sub may include any further downhole tools or equipment, such as a stabilizer, collapsible stabilizer, adjustable stabilizer, reamer, underreamer, sensors, telemetry system, formation pressure tester, varying or fixed magnetic or electric field generators, acoustic transmitters into the formation for distance and direction ranging or seismic sensing, which are required for the particular drilling operation. The sub may be a separate member fixedly or removably connected with one or both of the drive shaft and the drill bit or it may be integrally formed with one or both of the downhole end of the drive shaft and the drill bit. Further, the drill bit assembly may be further comprised of a bit box for connecting the drive shaft with the downhole components such as the sub or the drill bit. However, the bit box may be a separate member fixedly or removably connected with one or both of the drive shaft and the other downhole components, including a sub and the drill bit, or it may be integrally formed with one or both of the downhole end of the drive shaft and the other downhole components.

Further, each of the components of the drill bit assembly may be integrally formed with the other components and the drill bit such that a single unit or member is provided. Alternately, each of the components of the drill bit assembly may be fixedly or removably connected or attached, such as by welding or threaded connections therebetween.

Additionally, the telemetry system is further preferably comprised of at least one sensor located in the downhole end of the drive train, wherein the sensor provides information to the transmitter. The transmitter may transmit the information to the axial conducting loop, or alternately as discussed above, the axial conducting loop may be used to provide power to one or both of the transmitter and the sensor.

Preferably, at least one sensor is located in the downhole end of the drive train. Depending upon the particular type of sensor and the type of information sought to be provided to the transmitter, the sensor may be located at any position or location within the downhole end of the drive train. However, preferably, at least one sensor is located in the drill bit assembly, wherein the sensor provides information to the transmitter. Although the sensor may be located within any of the components or elements comprising the drill bit assembly as discussed above, the sensor is located in the drill bit in the preferred embodiment. In this case, it may be necessary to provide a non-magnetic bit so that there is no interference with the sensor if the sensor is magnetic field sensing. This non-magnetic property could extend upwards from the bit along the driveshaft and housing as necessary to reduce interference to acceptable levels.

Any type of sensor or combination of sensors may be used which are capable of providing information regarding the downhole conditions, formation characteristics or the drilling operation including information about the drill bit or other components of the drill string including the downhole end of the drive train, information about the borehole in the vicinity of the drive train, particularly the downhole end and information about the formation in the vicinity of the drive train, particularly the downhole end. For example, each sensor may be comprised of a natural gamma ray, resistivity, porosity, density, pressure, temperature, vibration, acoustic, seismic, magnetic field, gravity, acceleration (angular or linear), gyroscopic, magnetic resonance, torque, weight or diameter caliper sensor for measuring formation characteristics, movement of the planet earth to determine a North vector relative to the current borehole attitude, drill string movement (angular and/or linear), weight on the bit, over pull, drill string rpm, slip stick of the bit or drill string, flow rate, fluid viscosity, gas kick detection, hole diameter or other downhole parameters, or for sensing externally generated signals for detection of nearby wells such as magnetic, electromagnetic, electric fields, acoustic signals or noise such as flowing gas or fluid or drilling noise in nearby wells. In addition, each sensor may be comprised of a magnetometer, accelerometer or other sensor for measuring the direction, inclination, azimuth or trajectory of the borehole, weight-on-bit, torque-on-bit or other drilling parameters. Also, each sensor may measure or provide information concerning the drill bit parameters or conditions of the drill bit such as drill bit temperature, weight-on-bit, torque-on-bit or the differential pressure across the bit, bit bearing condition, if roller cone style, bit cutter noise to detect broken or worn polycrystalline diamond cutters ("PDC") or teeth.

In addition to having sensors, the loop can be used to communicate actuation commands to various devices preferably located within the borehole in the vicinity of the drive train, particularly the downhole end. Such devices include collapsible stabilizers, variable gage stabilizers, push pads or rollers for side loading the bit, impact hammers, under reamer extensions or retractions, formation pressure measurement devices, devices for changing the diameter of the bit cutting structure, variable fluid by-pass ports to control bit pressure drop or deflection pads to kick over into a lateral well bore, to name a few such devices or uses.

As indicated above, where the communication of information or power to or from greater than one sensor is desired, a plurality of parallel axial conducting loops may be formed by the drill string. Specifically, the parallel axial conducting loops may be spaced about the circumference of the specific components of the drill string or may be layered upon each other through the specific components of the drill string.

As indicated, the axial conducting loop extends between the first axial position and the second axial position in the drill string. The first and second axial positions may be located at any position along the length of the drill string between the uphole and downhole ends of the drill string. Thus, the axial conducting loop may conduct the axial electrical signal through or along any selected or desired portion or section of the drill string. Further, the length of the axial conducting loop may be any selected length such that the axial conducting loop may extend along the entire length of the drill string or any selected portion of the drill string between the uphole and downhole ends. In the event that the axial conducting loop does not extend for the complete length of the drill string, or where otherwise desirable, the telemetry system and method of the within invention may be used in conjunction or combination with one or more further known or conventional telemetry systems or surface communication systems. Alternately, as described above, the drill string may form a plurality of axial conducting loops electrically connected in series with each other, or with an alternate surface communication system, along the desired length of the drill string.

The system also preferably comprises a receiver for receiving the information from the axial conducting loop. In the preferred embodiment, the transmitter is located adjacent to one of the first axial position and the second axial position and the receiver is located adjacent to the other of the first axial position and the second axial position.

Further, the receiver is preferably adapted to be electrically connected with a surface communication system in order that information from the sensor can be communicated by the surface communication system. Thus, the sensor provides the information to the transmitter, which transmits the information to the axial conducting loop. The information is then received by the receiver from the axial conducting loop and communicated to the surface communication system. As a result, in the preferred embodiment, information from the sensor located within the drill bit assembly may be transmitted or communicated to the surface.

Any transmitter capable of transmitting the information to the axial conducting loop may be used. However, the transmitter is preferably comprised of a transmitter conductor for conducting a transmitter electrical signal embodying the information such that conducting of the axial electrical signal in the axial conducting loop will be induced from the conducting of the transmitter electrical signal in the transmitter conductor. As well, the transmitter further preferably comprises a transmitter processor for receiving the information and for generating the transmitter electrical signal.

Similarly, any receiver capable of receiving the information from the axial conducting loop may be used. However, the receiver is preferably comprised of a receiver conductor for conducting a receiver electrical signal embodying the information such that conducting of the receiver electrical signal in the receiver conductor will be induced from the conducting of the axial electrical signal in the axial conducting loop. As well, the receiver further preferably comprises a receiver processor for receiving the receiver electrical signal and for obtaining the information from the receiver electrical signal.

In addition, the transmitter is preferably a transceiver which is capable of both transmitting and receiving the information. Similarly, the receiver is preferably a transceiver which is capable of both transmitting and receiving the information. Thus, although the information may be communicated in one direction only along the drill string, in the preferred embodiment, the information is able to be communicated bidirectionally along the drill string.

The transmitter conductor may be comprised of any conductor capable of conducting the transmitter electrical signal such that conducting of the axial electrical signal in the axial conducting loop will be induced from the conducting of the transmitter electrical signal in the transmitter conductor. Preferably, the transmitter conductor is comprised of a transmitter coil comprising a plurality of windings. Further, the transmitter conductor preferably includes a magnetically permeable toroidal transmitter core and the windings of the transmitter coil are wrapped around the transmitter core. The transmitter coil may include any number of windings compatible with the functioning of the transmitter conductor as described above.

The receiver conductor may be comprised of any conductor capable of conducting the receiver electrical signal embodying the information such that conducting of the receiver electrical signal in the receiver conductor will be induced from the conducting of the axial electrical signal in the axial conducting loop. Preferably, the receiver conductor is comprised of a receiver coil comprising a plurality of windings. Further, the receiver conductor preferably includes a magnetically permeable toroidal receiver core and the windings of the receiver coil are wrapped around the receiver core. The receiver coil may include any number of windings compatible with the functioning of the receiver conductor as described above.

As indicated above, at least a portion of the drill string between the first axial position and the second axial position may be comprised of the outer axial conductor, the inner axial conductor and the electrical insulator as described above. This portion of the drill string, which may be referred to herein as the "co-axial" portion of the drill string, provides for substantially coincidental axes of the inner circumferential surface of the outer axial conductor and the outer circumferential surface of the inner axial conductor.

As stated, the co-axial portion of the drill string may extend between the first and second axial positions. Alternately, the co-axial portion of the drill string may form or comprise one or more parts, portions or sections of the drill string between the first and second axial positions. In this instance, the remainder or balance of the drill string between the first and second axial positions may be comprised of one or more further known or conventional telemetry systems, surface communication systems, or other conductive components capable of conducting the axial electrical signal along the drill string. For example, the remainder or balance of the drill string between the first and second axial positions may be comprised of a hard-wired connection.

With respect to the co-axial portion of the drill string, the drill string may be comprised of a length of drill pipe and the co-axial portion of the drill string may be comprised of the drill pipe. Additionally, the drill string may be comprised of a downhole motor drilling assembly and the co-axial portion of the drill string may be comprised of the downhole motor drilling assembly. More particularly, the downhole motor drilling assembly may be comprised of the drive train rotationally supported within a housing, wherein the co-axial portion of the drill string may be comprised of the downhole end of the drive train. As well, the co-axial portion may be formed by a portion of the drill string above the downhole end of the drive train.

The inner axial conductor and the outer axial conductor may each be comprised of any of the components or elements of the drill string. However, the outer axial conductor is preferably comprised of an outer tubular member. Any conductive tubular member may be used so long as the inner axial conductor may be fixedly connected within the outer tubular member such that the annular space is defined and such that the first and second longitudinal axes are substantially coincidental.

Further, although the inner axial conductor may be a solid member, the inner axial conductor preferably defines a fluid pathway suitable for conducting a fluid therethrough. In addition, in some instances, it may also be preferable for the inner axial conductor to provide through-bore access through the drill string. Accordingly, in the preferred embodiment, the inner axial conductor is comprised of an inner tubular member fixedly connected within the outer axial conductor. Any conductive inner tubular member may be used so long as the inner tubular member may be fixedly connected within the outer tubular member such that the annular space is defined and such that the first and second longitudinal axes are substantially coincidental. For instance, the inner tubular member may be comprised of an inner sleeve or mandrel fixedly connected within the outer tubular member or it may be comprised of a coating of an electrically conductive material fixedly connected or affixed within the outer tubular member.

The inner circumferential surface of the outer axial conductor and the outer circumferential surface of the inner axial conductor define an annular space therebetween. The electrical insulator is disposed within the annular space. Preferably, the annular space is defined about the complete or entire perimeter or circumference of the inner circumferential surface. However, the annular space may be defined about less than the complete or entire circumference provided that the electrical insulator may be disposed therein in a manner permitting the electrical insulator to perform its function and inhibit the short-circuiting of the axial conducting loop. In other words, the size, dimensions or configuration of the annular space are selected to permit the necessary or desirable type and quantity of the electrical insulator to be disposed therein such that the inner circumferential surface may be sufficiently electrically insulated from the outer circumferential surface to inhibit or prevent the short circuiting of the axial conducting loop.

The electrical insulator may be comprised of any material capable of electrically insulating, to the desired or required degree, the inner circumferential surface from the outer circumferential surface. Preferably, the electrical insulator is comprised of a layer of electrically insulative material disposed in the annular space. For instance, the layer of electrically insulative material may be comprised of a hardened epoxy resin, an insulating ceramic material or a rubber coating.

Further, the layer of electrically insulative material may be in any form and have any configuration suitable for disposal in the annular space. For instance, the layer may be comprised of a sleeve or tubular member formed from the electrically insulative material which is positioned within the annular space, either permanently or removably, between the adjacent inner and outer circumferential surfaces. Alternately, the layer may be comprised of a coating of the electrically insulative material. In the preferred embodiment, the electrical insulator is comprised of an insulative coating of the electrically insulative material applied to at least one of the outer circumferential surface of the inner axial conductor and the inner circumferential surface of the outer axial conductor.

For example, the inner axial conductor may be comprised of an expandable tubular pipe or member having a rubber coating applied to the outer circumferential surface. Thus, once in position within the outer axial conductor, the inner axial conductor is swaged to expand the inner axial conductor and provide for a rubber insulative coating between the outer circumferential surface of the inner axial conductor and the inner circumferential surface of the outer axial conductor.

The above aspects of the outer axial conductor, the inner axial conductor and the electrical insulator may be applied to any portion of the drill string forming the axial conducting loop. For instance, in one embodiment of the system, the downhole end of the drive train may be comprised of:

(a) a first outer axial conductor having an inner circumferential surface defining an outer conductor longitudinal axis;
(b) a first inner axial conductor having an outer circumferential surface defining an inner conductor longitudinal axis, wherein the first inner axial conductor is fixedly connected within the first outer axial conductor such that an annular space is defined between the outer circumferential surface and the inner circumferential surface, wherein the outer conductor longitudinal axis and the inner conductor longitudinal axis are substantially coincidental and wherein at least a portion of the axial conducting loop is comprised of the first outer axial conductor and the first inner axial conductor; and
(c) an electrical insulator disposed within the annular space.

In this embodiment, the first inner axial conductor preferably defines a fluid pathway suitable for conducting a fluid therethrough. Further, the electrical insulator is preferably comprised of a layer of an electrically insulative material disposed within the annular space. In a preferred form of this embodiment, the electrical insulator is comprised of an insulative coating of the electrically insulative material applied to at least one of the outer circumferential surface of the inner axial conductor and the inner circumferential surface of the outer axial conductor.

Further, in this embodiment, a portion of the axial conducting loop may be formed by the drill string above the downhole end of the drive train and wherein a portion of the axial conducting loop above the downhole end of the drive train is comprised of a second outer axial conductor comprised of the housing and a second inner axial conductor comprised of the drive train. The second outer axial conductor and the second inner axial conductor may be co-axial as described for the first outer and inner axial conductors. However, the second outer and inner axial conductors need not be co-axial so long as the second outer and inner axial conductors comprise a portion of the axial conducting loop. Preferably, the first outer axial conductor is electrically connected with the second outer axial conductor and the first inner axial conductor is electrically connected with the second inner axial conductor.

In a further embodiment of the system, the drill string may be comprised of a length of tubular drill pipe, wherein the length of drill pipe is comprised of:
(a) a third outer axial conductor having an inner circumferential surface defining a third outer conductor longitudinal axis;
(b) a third inner axial conductor having an outer circumferential surface defining a third inner conductor longitudinal axis, wherein the third inner axial conductor is fixedly connected within the third outer axial conductor such that an annular space is defined between the outer circumferential surface and the inner circumferential surface, wherein the third outer conductor longitudinal axis and the third inner conductor longitudinal axis are substantially coincidental, wherein the outer axial conductor is comprised of the third outer axial conductor, and wherein the inner axial conductor is comprised of the third inner axial conductor, such that at least a portion of the axial conducting loop is comprised of the third outer axial conductor and the third inner axial conductor; and
(c) an electrical insulator disposed within the annular space.

In this further embodiment, the third inner axial conductor preferably defines a fluid pathway suitable for conducting a fluid therethrough. Further, the electrical insulator is preferably comprised of a layer of an electrically insulative material disposed within the annular space. In a preferred form of this embodiment, the electrical insulator is comprised of an insulative coating of the electrically insulative material applied to at least one of the outer circumferential surface of the inner axial conductor and the inner circumferential surface of the outer axial conductor.

In addition, in this further embodiment, the drill string is further preferably comprised of the drive train supported within the housing and wherein the length of drill pipe is located above the housing. In this instance, a portion of the axial conducting loop may be comprised of a second outer axial conductor comprised of the housing and a second inner axial conductor comprised of the drive train. The second outer axial conductor and the second inner axial conductor may be co-axial as described for the third outer and inner axial conductors. However, the second outer and inner axial conductors need not be co-axial so long as the second outer and inner axial conductors comprise a portion of the axial conducting loop. Preferably, the third outer axial conductor is electrically connected with the second outer axial conductor and the third inner axial conductor is electrically connected with the second inner axial conductor.

Finally, in this further embodiment, the downhole end of the drive train may be comprised of the first outer axial conductor, the first inner axial conductor and the electrical insulator as described above for the previous embodiment of the system.

In the preferred embodiment, the drill string is comprised of the first outer and inner axial conductors, the second outer and inner axial conductors and the third outer and inner axial conductors. Preferably, the first outer axial conductor is electrically connected with the second outer axial conductor and the first inner axial conductor is electrically connected with the second inner axial conductor. Further, preferably, the third outer axial conductor is electrically connected with the second outer axial conductor and the third inner axial conductor is electrically connected with the second inner axial conductor. Finally, the downhole end of the drive train preferably defines a fluid path suitable for conducting a fluid therethrough.

As indicated, the within invention is comprised of a telemetry system and a method. Although the method is preferably performed using the telemetry system of the within invention, the method may be performed using any telemetry system capable of performing the method as described herein.

In a third aspect of the invention, the invention is comprised of a method for communicating information axially along a drill string comprised of a drive train supported within a housing. The method comprises the step of conducting an axial electrical signal embodying the information between a first axial position in the drill string and a second axial position in the drill string through an axial conducting loop formed by the drill string, which axial conducting loop extends between the first axial position and the second axial position, wherein the drive train is comprised of a downhole end, wherein the downhole end of the drive train extends from and is located below the housing, and wherein at least one of the first axial position and the second axial position is located in the downhole end of the drive train.

The method may further comprise the steps of: (a) conducting through a transmitter conductor a transmitter electrical signal embodying the information; and (b) inducing from the conducting of the transmitter electrical signal the conducting through the axial conducting loop of the axial electrical signal. As well, the method may further comprise the step of inducing from the conducting of the axial electrical signal the conducting through a receiver conductor of a receiver electrical signal embodying the information.

In addition, before conducting the transmitter electrical signal through the transmitter conductor, the method may further comprise the following steps: (a) receiving the information; and (b) generating the transmitter electrical signal. After conducting the receiver electrical signal through the receiver conductor, the method may further comprise the step of obtaining the information from the receiver electrical signal. Preferably, the transmitter conductor and the receiver conductor are located between the first axial position and the second axial position.

Further, in the within method, the transmitter electrical signal is comprised of a varying electrical signal. The transmitter electrical signal may be a unipolar varying electrical signal or a bipolar varying electrical signal. However, a unipolar varying electrical signal is preferred. The varying transmitter electrical signal may have any carrier frequency, voltage and current capable of inducing the conducting of the axial electrical signal through the axial conducting loop. Preferably, the transmitter electrical signal is comprised of a varying electrical signal having a carrier frequency of between about 10 kilohertz and about 2 megahertz, and more preferably, of about 400 kilohertz. Further, the transmitter electrical signal preferably has a voltage of between about 2 volts (peak to peak) and about 10 volts (peak to peak), and more preferably, of about 5 volts (peak to peak). In the preferred embodiment, the unipolar varying electrical signal has a voltage of between about 2 volts (peak) and about 10 volts (peak).

However, the frequency used may be limited by the electrical capacitance created between the inner and outer axial conductors, which is proportionate to the areas of the inner surface of the outer axial conductor and the outer surface of the inner axial conductor. Voltage is dependent upon the carrying capacity of the dielectric or insulating material.

BRIEF DESCRIPTION OF DRAWINGS

Embodiments of the invention will now be described with reference to the accompanying drawings, in which:

FIG. 4 is a longitudinal sectional view of an upper portion of the drill string, as shown in FIG. 3, comprised of a drill pipe;

FIG. 5 is a more detailed sectional view of a portion of the drill pipe shown in FIG. 4;

FIG. 6 is a side view of a lower portion of the drill string, as shown in FIG. 3, wherein portions of the housing have been cut-away;

FIGS. 7(a) through 7(f) are longitudinal sectional views in sequence of the lower portion of the drill string shown in FIG. 6, FIGS. 7(b) through 7(f) being lower continuations respectively of FIGS. 7(a) through 7(e);

DETAILED DESCRIPTION

Figure 1:
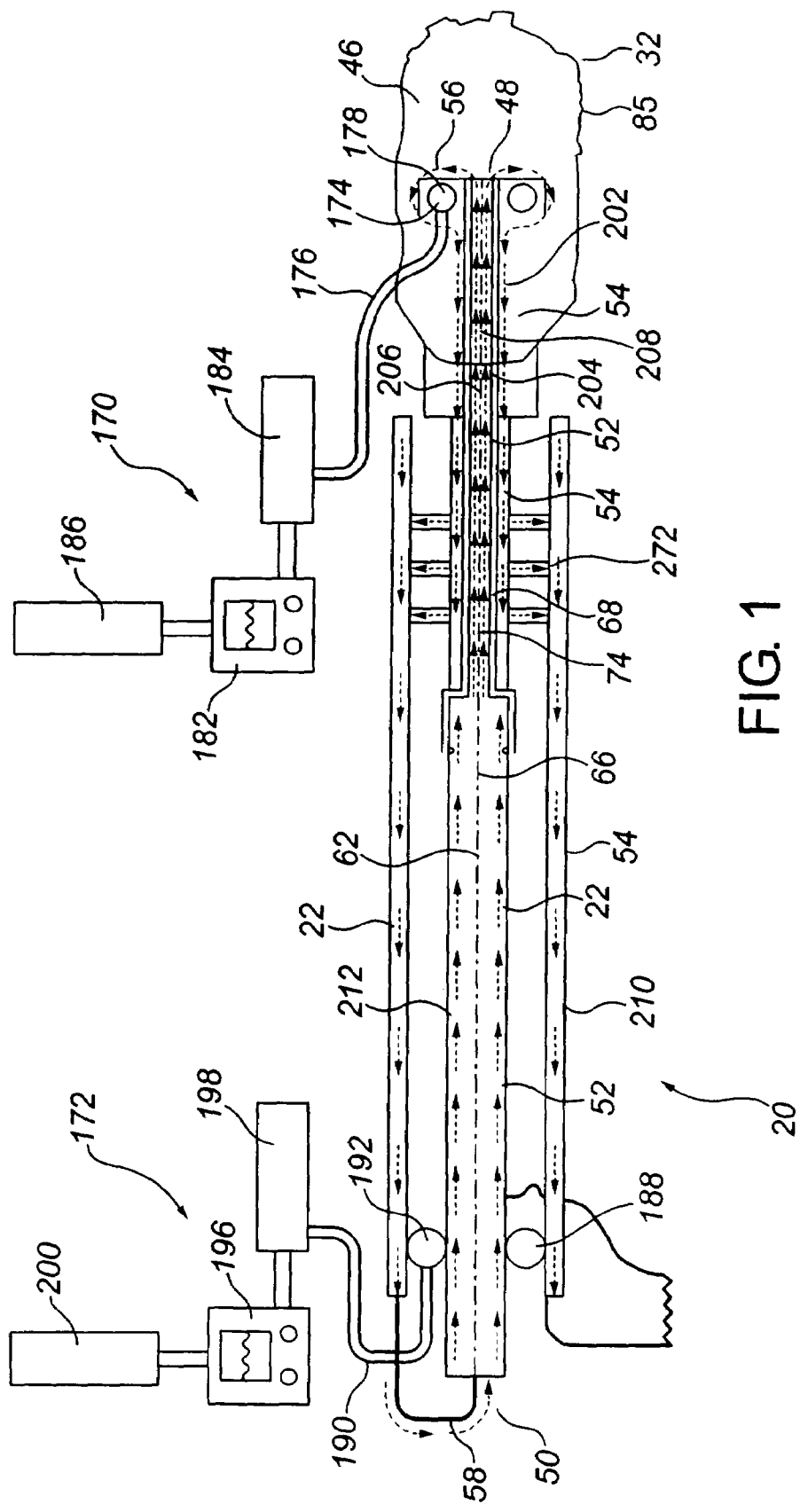
FIG. 1 is a side schematic drawing of a preferred embodiment of a system of the within invention showing an axial conducting loop.
Figure 2:
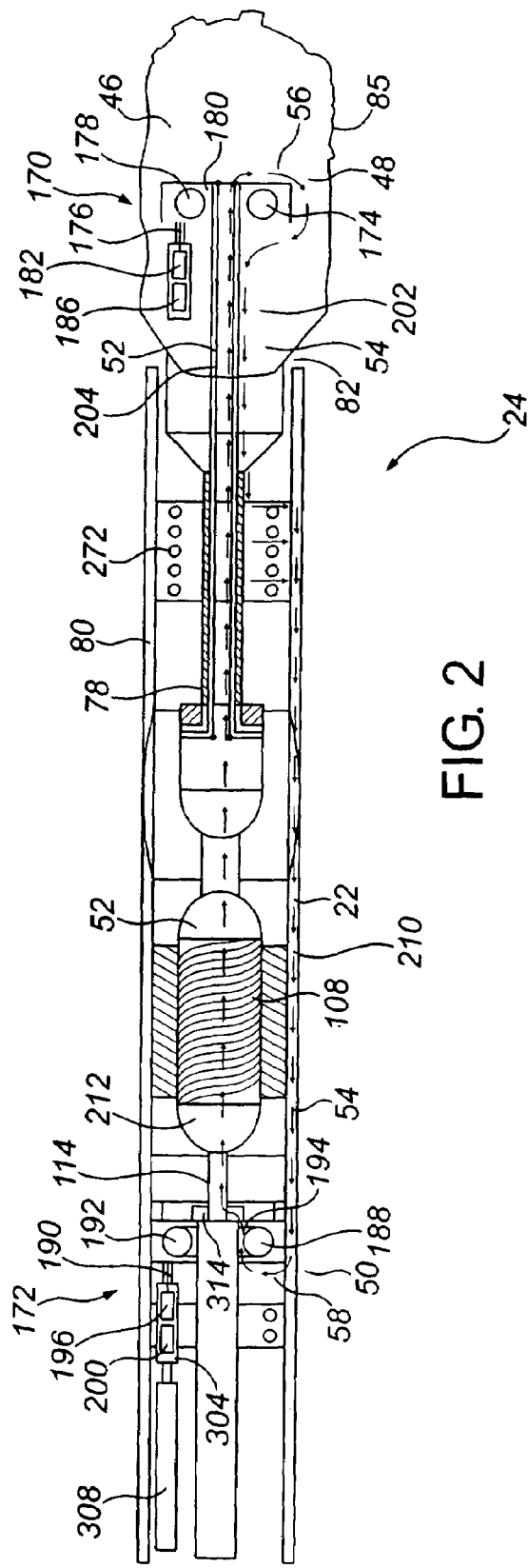
FIG. 2 is a further side schematic drawing of the preferred embodiment of the system, schematically showing a drive train supported within a housing.

The present invention relates to a method and system for communicating information axially along a drill string (20) by conducting an axial electrical signal embodying the information between a first axial position in the drill string (20) and a second axial position in the drill string (20) through an axial conducting loop (22) formed by the drill string (20), which axial conducting loop (22) extends between the first axial position and the second axial position.

The system may be used to communicate information along any length of drill string (20) which is capable of forming the axial conducting loop (22) and may be used to communicate information along the drill string (20) either from the first axial position to the second axial position or from the second axial position to the first axial position. Preferably the system is capable of communicating information in both directions along the drill string (20) so that the information can be communicated either toward the surface or away from the surface of a borehole in which the drill string (20) is contained.

Information communicated toward the surface using the system may typically relate to drilling operations or to the environment in which drilling is taking place, such as for example weight-on-bit, natural gamma ray emissions, borehole inclination, borehole pressure, mud cake resistivity and so on. Information communicated away from the surface using the invention may typically relate to instructions sent from the surface, such as for example a signal from the surface prompting the system to send information back to the surface or instructions from the surface to alter drilling operations where a downhole motor drilling assembly is being used. Further, the system may transmit power from the surface using the invention to a downhole tool or other downhole equipment.

Preferably the invention is used in conjunction with a downhole motor drilling assembly (24) and is preferably further used as a component of, or in conjunction with, a surface communication system (26), such as a known or conventional MWD system, which provides communication to and from the surface during drilling operations. In this specification, the terms "downhole motor drilling assembly" and "drilling assembly" are used interchangeably and both terms include those components of the drill string (20) which are associated with the downhole motor. As an alternative to using the telemetry system of the within invention with a surface communication system, or in addition to using it with a surface communication system, greater than one telemetry system as described herein may be provided or formed by the drill string along its length.

The system of the invention is intended to be incorporated into a drill string (20). When positioned in the borehole, the drill string (20) extends from an uphole end at the ground surface to a downhole end typically comprised of the downhole motor drilling assembly (24). The system may be incorporated into the drill string (20) at any position or location, or at more than one position or location, along the drill string (20) between the uphole and downhole ends. In the preferred embodiment, the system is at least incorporated into the drill string (20) at the downhole end, and more particularly, is preferably incorporated into at least the downhole motor drilling assembly (24), as described in detail below.

Figure 3:
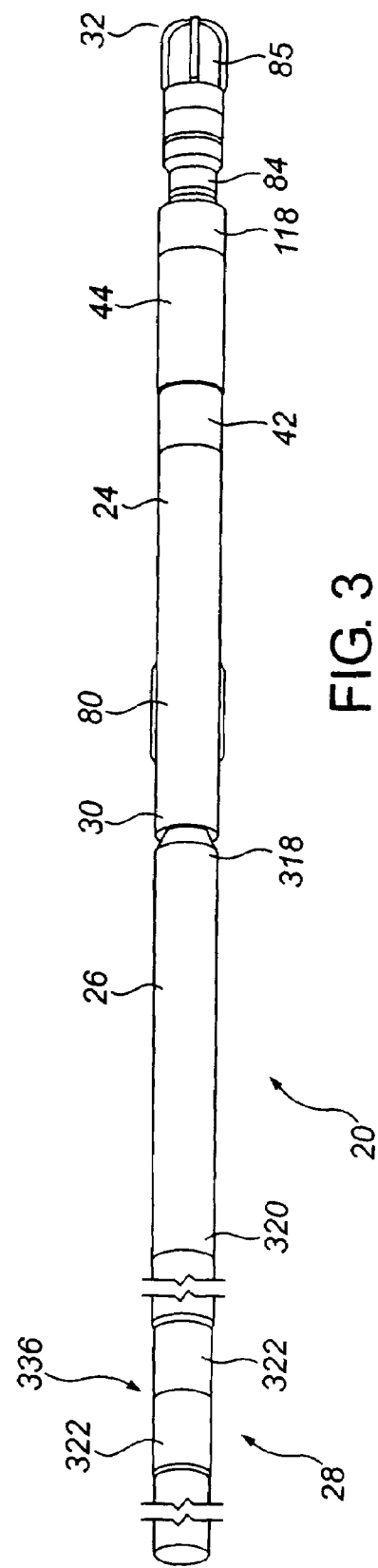
FIG. 3 is a pictorial side view of a drill string including the preferred embodiment of the system.

Referring to FIG. 3, a lower or downhole portion of the drill string (20) is shown. The drill string (20) is comprised of a number of components which are removably or permanently connected or affixed together in any suitable manner, such as by welding or threaded connections. Beginning at the more uphole end and moving towards the downhole end of the drill string (20), a length of tubular drill pipe (28) is threadably connected with an upper end of a surface communication system (26). The drill pipe (28) may be of any desirable length and may extended from the surface communication system (26) to the surface or for any portion of the length of the drill string (20) therebetween. In addition, one or more further lengths of tubular drill pipe (28) may be positioned or interspersed along the length of the drill string (20) as desired or required for any particular drilling operation to perform its intended function as discussed below, being the further communication of information along the drill string (20). The length of drill pipe (28) shown in FIG. 3 is positioned uphole of the surface communication system (26) for illustrative purposes. Thus, for instance, the length of drill pipe (28) may be positioned below or downhole of the surface communication system (26).

The drill string (20) preferably includes any known or conventional surface communication system (26) to further communicate the information axially along the drill string (20). In this case, the system as described herein is adapted to be electrically connected with the surface communication system (26), uphole, downhole or both, in order that information may be conducted along the drill string (20) for the desired distance. A lower or downhole end of the surface communication system (26) is threadably connected with the downhole motor drilling assembly (24) as described further below.

Referring to FIGS. 3 and 6–8, the downhole motor drilling assembly (24) according to a preferred embodiment of the present invention is shown. The drilling assembly (24) has an upper end (30) and a lower end (32) and in the preferred embodiment is comprised of a number of components connected together. Beginning at the upper end (30) and moving toward the lower end (32), the drilling assembly (24) includes a receiver sub (34), a crossover sub (36), a power unit (38), a transmission unit (40), a bearing sub (42), a lower bearing sub (44) and a drill bit assembly (46), all preferably removably connected end to end with threaded connections.

The drilling assembly (24) may be made up of a single component or a plurality of components other than as are described for the preferred embodiment of the invention. In addition, the components of the drilling assembly (24) may be connected together other than by using threaded connections. For example, some or all of the components may be connected by welding or with splined connections.

During drilling operations, the drill bit assembly (24) is located at the lower end (32) of the drilling assembly (24) and the upper end (30) of the drilling assembly (24) is connected to the remainder of the drill string, particularly the surface communication system (26), preferably by a threaded connection which is part of the receiver sub (34).

As indicated, the drill string (20) forms an axial conducting loop (22) for conducting an axial electrical signal embodying the information between a first axial position (48) in the drill string (20) and a second axial position (50) in the drill string (20). Thus, the axial conducting loop (22) extends between the first axial position (48) and the second axial position (50) in the drill string (20). The axial positions (48, 50) are interchangeable. In other words, the first axial position (48) may be located closer to the lower or downhole end of the drill string (20) than is the second axial position (50), or vice versa. In the preferred embodiment, the first axial position (48) is closer to the lower end of the drill string (20) than is the second axial position (50). However, the exact positions or locations of the first and second axial positions (48, 50) will vary depending upon the particular embodiment of the system and the particular location of the system along the length of the drill string (20).

The axial conducting loop (22) may be formed by any component or components of the drill string (20). Further, more than one axial conducting loop (22) may be formed by the components of the drill string (20), wherein the axial conducting loops (22) are preferably electrically connected to permit the information to be communicated along the drill string (20) between the axial conducting loops (22). For example, in the preferred embodiment, an axial conducting loop (22) is associated with and formed by the components of the drill string (20) comprising the drilling assembly (24). Further, the first axial position (48) and the second axial position (50) are located in the drilling assembly (24) such that the axial conducting loop (22) extends within the drilling assembly (24).

However, alternately, one of the first and second axial positions (48, 50) may be located at any position uphole of the drilling assembly (24) including at the surface such that the axial conducting loop (22) extends between the drilling assembly (24) and the surface. As indicated, each of the first and second axial positions (48, 50) may be at any desired location along the length of the drill string (20).

Further, in the preferred embodiment, the axial conducting loop (22) of the drilling assembly (24) communicates with and is electrically connected with the surface communication system (26) so that the information may be communicated further uphole. Although any surface communication system (26) may be utilized, the surface communication system (26) may also include a further axial conducting loop which communicates with the axial conducting loop (22) of the drilling assembly (24).

Finally, as discussed, a portion of a further axial conducting loop (22) may be formed by the components of the drill string (20) above or uphole of the surface communication system (26), particularly by one or more lengths of drill pipe (28) which may extend any distance along the drill string (20) between the surface communication system (26) and the surface. In this instance, each of a first axial position (48) and a second axial position (50) may be located in the drill pipe (28), uphole of the drill pipe (28) or downhole of the drill pipe (28) such that at least a portion of this further axial conducting loop (22) extends through the drill pipe (28).

In the preferred embodiment, at least a portion of the drill string (20) between the first axial position (48) and the second axial position (50) is comprised of an inner axial conductor (52) and an outer axial conductor (54). In other words, at least a portion of the axial conducting loop (22) is comprised of the outer axial conductor (54) and the inner axial conductor (52), which are preferably conductively connected with each other at the first axial position (48) by a first conductive connection (56) and are conductively connected with each other at the second axial position (50) by a second conductive connection (58). As indicated, the portion of the drill string (20) including the inner and outer axial conductors (52, 54) may be comprised of any of the components of the drill string (20) including the drilling assembly (24) and the drill pipe (28).

Preferably, the axial conducting loop (22) provides a continuous conductor loop having a resistance lower than the apparent resistance of the surrounding geological formation during drilling operations so that an axial electrical signal can be conducted around the axial conducting loop (22) without significant energy losses and without a significant amount of the axial electrical signal being diverted to the formation. In particular, the axial conducting loop preferably does not include a "gap" either in the axial conductors (52, 54) or in the conductive connections (56, 58) which would assist in diverting the axial electrical signal into the formation. Thus, in effect, the axial conducting loop (22) does not include the formation as an "in series" component of the current path for the axial electrical signal. The formation may however provide a parallel current path to the outer axial conductor (54). In this case, it has been found that there is no significant effect of the formation on the axial electrical signal regardless of whether the formation is highly conductive or highly resistive. Therefore, the conducting of the axial electrical signal around the axial conducting loop (22) is substantially formation independent.

Further, preferably, the axial conducting loop (22) provides a continuous conductor loop having a resistance lower than the resistance of the drilling mud or other drilling fluids passing through the drill string (20) during drilling operations so that the axial electrical signal can be conducted around the axial conducting loop (22) without a significant amount of the axial electrical signal being diverted and lost to the drilling fluids. In particular, preferably, the axial conducting loop (22) is insulated at any point or location of exposure to the drilling fluids. As well, the axial electrical signal is preferably conducted around the axial conducting loop (22) without a significant amount of short circuiting between the axial positions (48, 50). Thus, the axial conductor loop (22) is also preferably insulated between the inner and outer axial conductors (52, 54).

Further, in the preferred embodiment, at least a portion of the drill string (20) is preferably comprised of a co-axial portion wherein the inner axial conductor (52) and the outer axial conductor (54) have substantially concurrent or coincident axes. More particularly, the outer axial conductor (54) has an inner circumferential surface (60) defining an outer conductor longitudinal axis (62). Further, the inner axial conductor (52) has an outer circumferential surface (64) defining an inner conductor longitudinal axis (66). The outer conductor longitudinal axis (62) and the inner conductor longitudinal axis (66) are preferably substantially coincidental.

With respect to at least a portion of the drill string (20), the inner axial conductor (52) is fixedly connected within the outer axial conductor (54) such that an annular space (68) is defined between the outer circumferential surface (64) and the inner circumferential surface (60). The inner axial conductor (52) may be fixedly connected within the outer axial conductor (54) in any manner or by any structure or mechanism inhibiting the movement of the inner axial conductor (52) relative to the outer axial conductor (54) while providing the annular space (68). Preferably, relative rotational movement of the inner and outer axial conductors (52, 54) is inhibited. However, in the preferred embodiment, relative longitudinal and rotational movement are both inhibited.

For instance, the outer axial conductor (54) is preferably comprised of a conductive outer tubular member (70). Further, the inner axial conductor (52) is preferably comprised of a conductive inner tubular member (72) which is adapted for insertion in the outer tubular member (70) and which is affixed or mounted within the outer tubular member (70). The inner tubular member (72) may be comprised of a mandrel or sleeve inserted in the outer tubular member (70) or it may be comprised of a coating of an electrically conductive material applied within the outer tubular member (70). In addition, the inner tubular member (72) preferably provides a fluid pathway (74) extending therethrough to permit fluid to be conducted from one end to the other of the inner tubular member (72). Further, the fluid pathway (74) permits the passage of any tools or other equipment through the inner tubular member (72) where required.

Further, an electrical insulator (76) is disposed within the annular space (68). A sufficient amount and type of electrical insulator (76) is disposed in the annular space (68) to inhibit, and preferably substantially prevent, any short-circuiting of the axial conducting loop (22) between the inner and outer axial conductors (52, 54).

In the preferred embodiment, the outer axial conductor (54) has an inner circumferential surface (60), the inner axial conductor (52) has an outer circumferential surface (64) and the annular space (68) is provided therebetween. In the preferred embodiment, each of the outer axial conductor (54), the inner axial conductor (52) and the annular space (68) are circumferential in that they each extend about substantially the entire circumference or perimeter of the respective component or member. Thus, where parallel axial conducting loops are provided, the outer and inner axial conductors (54, 52) of one axial conducting loop (22) may be layered upon or disposed about the outer and inner axial conductors (54, 52) of a further axial conducting loop (22).

However, each of the outer axial conductor (54), the inner axial conductor (52) and the annular space (68) need not be completely circumferential so long as each comprises a portion of the circumference or perimeter of the respective component or member. For instance, the inner and outer axial conductors (52, 54) may each be comprised of a portion of the circumference of the components of the drill string (20) or drilling assembly (24) defining the axial conductors (52, 54) so long as the annular space (68) may be defined therebetween. This is particularly applicable where a plurality of parallel axial conducting loops are formed by the drill string (20). For example, the inner axial conductor (52) and the outer axial conductor (54) of each axial conducting loop (22) may extend parallel to each other and may be arranged in spaced relation about the complete circumference or perimeter of the components of the drill string (20).

The electrical insulator (76) is preferably comprised of a layer of an electrically insulative material or a plurality of layers of one or more electrically insulative materials disposed within the annular space (68). The electrical insulator (76) may be disposed or positioned in the annular space (68) in any manner. However, in order to reduce excessive wear on the electrical insulator (76) during use, the electrical insulator (76) is preferably fixedly connected with or applied to at least one of the outer circumferential surface (64) of the inner axial conductor (52) and the inner circumferential surface (60) of the outer axial conductor (54) so that movement of the electrical insulator (76) relative to the respective circumferential surface is inhibited.

In the preferred embodiment, the electrical insulator (76) is comprised of an insulative coating of at least one electrically insulative material, preferably a hardened epoxy resin. The coating is applied to at least one of the outer circumferential surface (64) of the inner axial conductor (52) and the inner circumferential surface (60) of the outer axial conductor (54).

As stated, any portion of the drill string (20) may be comprised of the inner axial conductor (52), the outer axial conductor (54) and the electrical insulator (76) as described herein. However, in the preferred embodiment, at least a portion of the drilling assembly (24) includes an inner axial conductor (52), an outer axial conductor (54) and an electrical insulator (76) as described. Further, a portion of the drill pipe (28) may also include an inner axial conductor (52), an outer axial conductor (54) and an electrical insulator (76) as described.

In addition, in the preferred embodiment, the drill string (20) is comprised of a drive train (78) supported within a housing (80). Actuation of the drive train (78) results in drilling of a borehole by the drill string (20) through the surrounding formation. Thus, the drive train (78) is defined to include any component or element of the drill string (20) which may be actuated, typically through rotation or reciprocation, to drill the borehole. In the preferred embodiment, the drill string (20) is comprised of the downhole motor drilling assembly (24) and the downhole motor drilling assembly (24) is comprised of the drive train (78) supported within the housing (80). However, alternately, portions of the drive train (78) need not specifically comprise or form a component of a downhole motor drilling assembly (24) but rather, may comprise or form a component of other downhole equipment such as a downhole drilling direction control device or steering tool.

As well, the drive train (78) may be supported within the housing (80) in any manner permitting the actuation of the drive train (78) within the housing (80). For instance, the housing (80) may permit the reciprocation of the drive train (78), or portions thereof, within the housing (80) in a reciprocating drilling system. However, in the preferred embodiment, the housing (80) permits the rotation of the drive train (78), or portions thereof, therein in a rotary drilling system.

More particularly, the drive train (78) is comprised of a downhole end (82) which extends from and is located below or downhole of the housing (80). In the preferred embodiment, at least a portion of the axial conducting loop (22) is comprised of or formed by the downhole end (82) of the drive train (78) extending from the housing (80). Accordingly, at least one of the first and second axial positions (48, 50) is located within the downhole end (82) of the drive train (78). Thus, the axial electrical signal embodying the information may be conducted through the downhole end (82) such that information may be communicated to or from the downhole end (82) of the drive train (80) or alternately, electrical power may be conducted to the downhole end (82) of the drive train (78).

More particularly, referring to FIGS. 1, 2 and 6 through 8, in the preferred embodiment, the drive train (78) and the housing (80) of the drilling assembly (24) are made up of parts of the receiver sub (34), the crossover sub (36), the power unit (38), the transmission unit (40), the bearing sub (42), the lower bearing sub (44) and the drill bit assembly (46).

Beginning at the lower end (32) of the drilling assembly (24), the downhole end (82) of the drive train (78) is comprised of the drill bit assembly (46) and a drive shaft (84). Specifically, the drive shaft (84) includes a distal end (86) which is adapted to be connected to the drill bit assembly (46). In the preferred embodiment, the distal end (86) of the drive shaft (84) is comprised of a bit box (87) adapted for connection with the drill bit assembly (46). Alternately, the drill bit assembly (46) may be comprised of the bit box (87) which is then adapted for connection to the distal end (86) of the drive shaft (84). Further, in the preferred embodiment, the drill bit assembly (46) is comprised of a drill bit (85) which is threadably connected with the distal end (86) of the drive shaft (84), being the bit box (87).

Figure 7A:
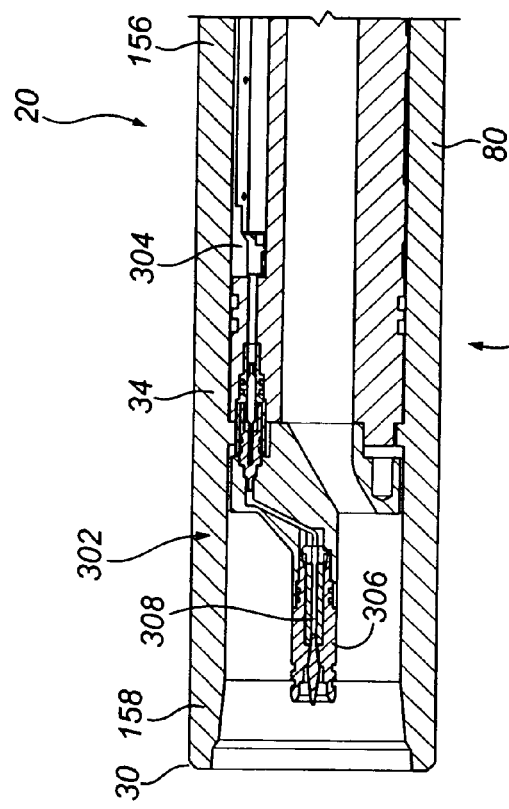
Figure 7B:
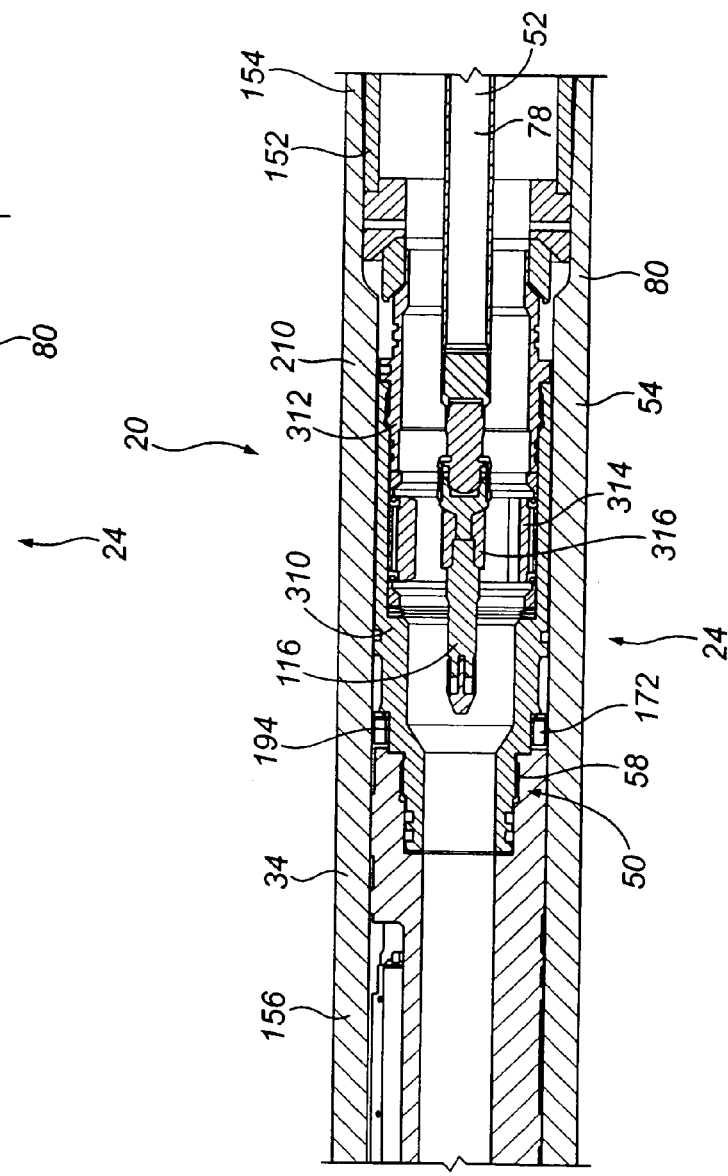
Figure 8A:
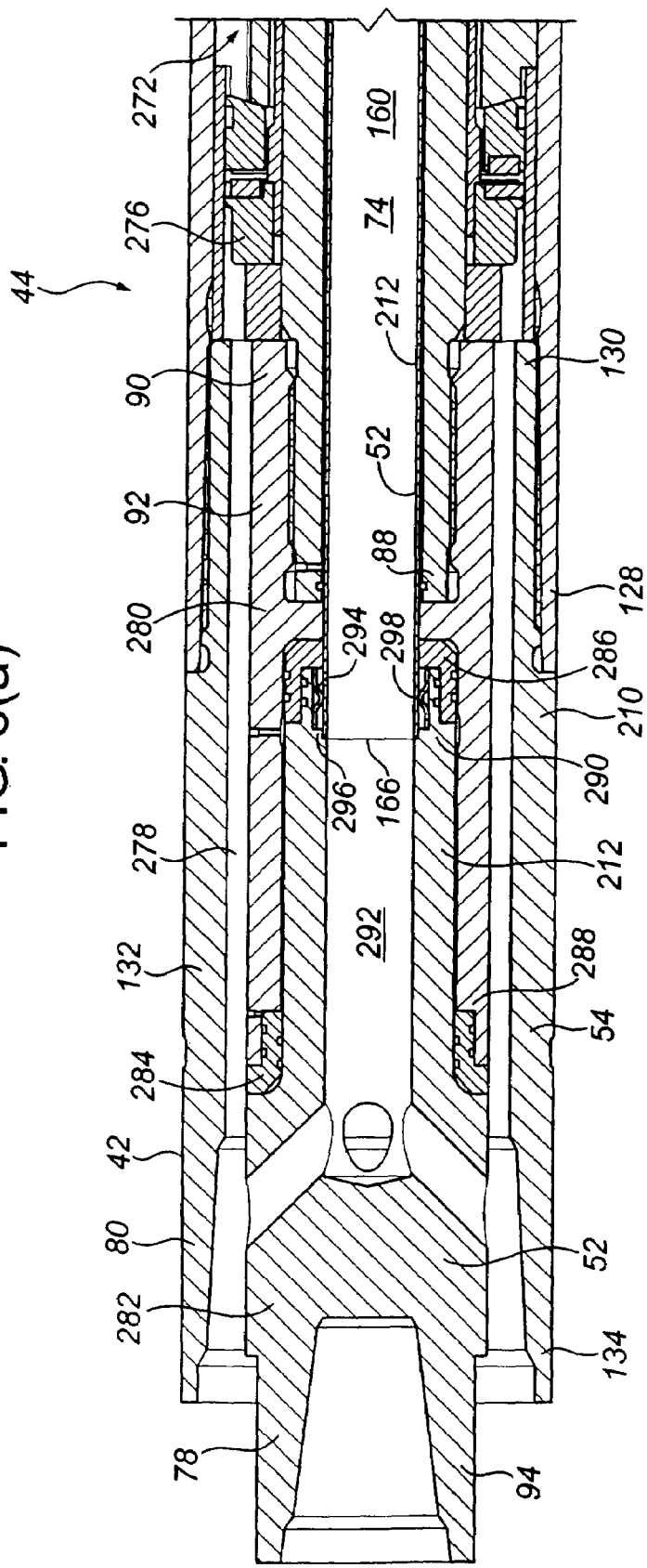
FIGS. 8(a) through 8(c) are more detailed longitudinal sectional views in sequence of a portion of a drive train in a housing as shown in FIGS. 7(e) and 7(f)
Figure 8B:
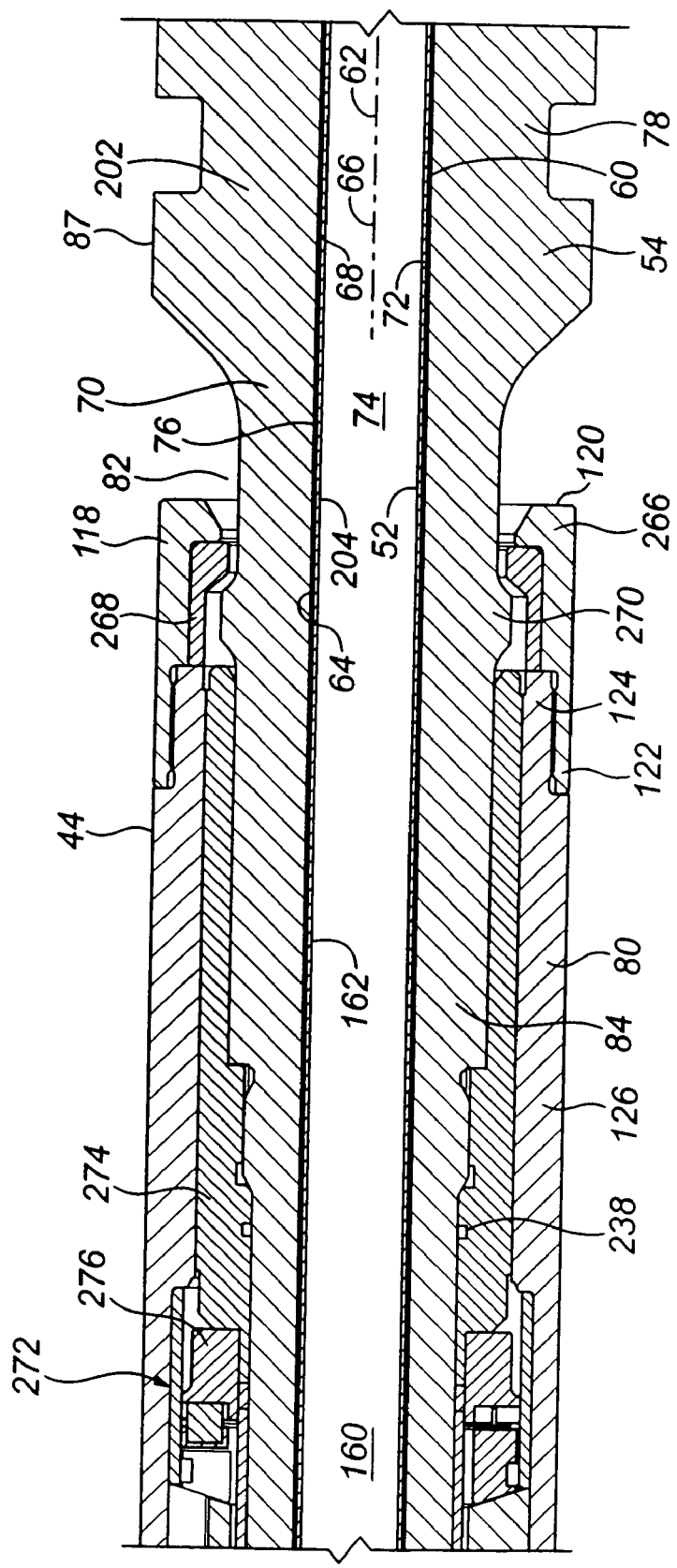
Figure 8C:
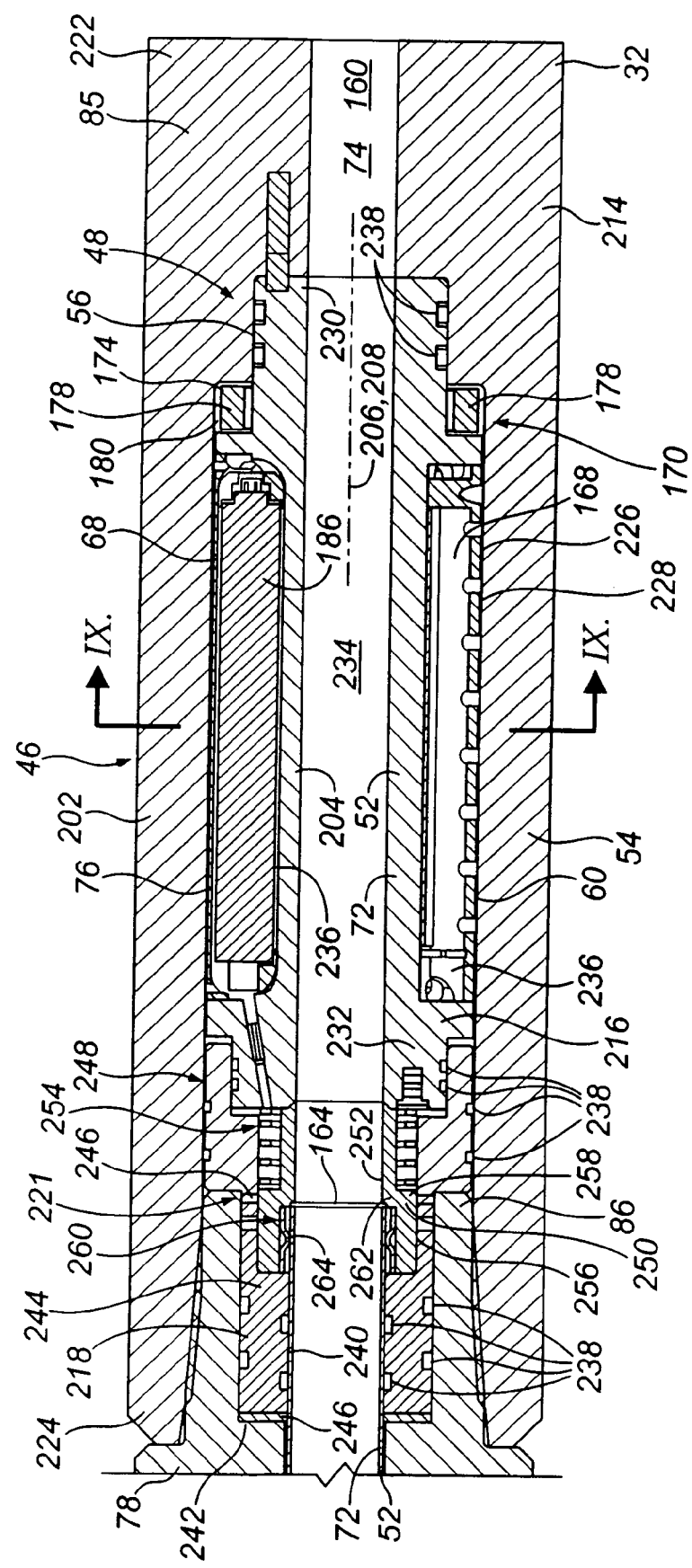
Figure 9:
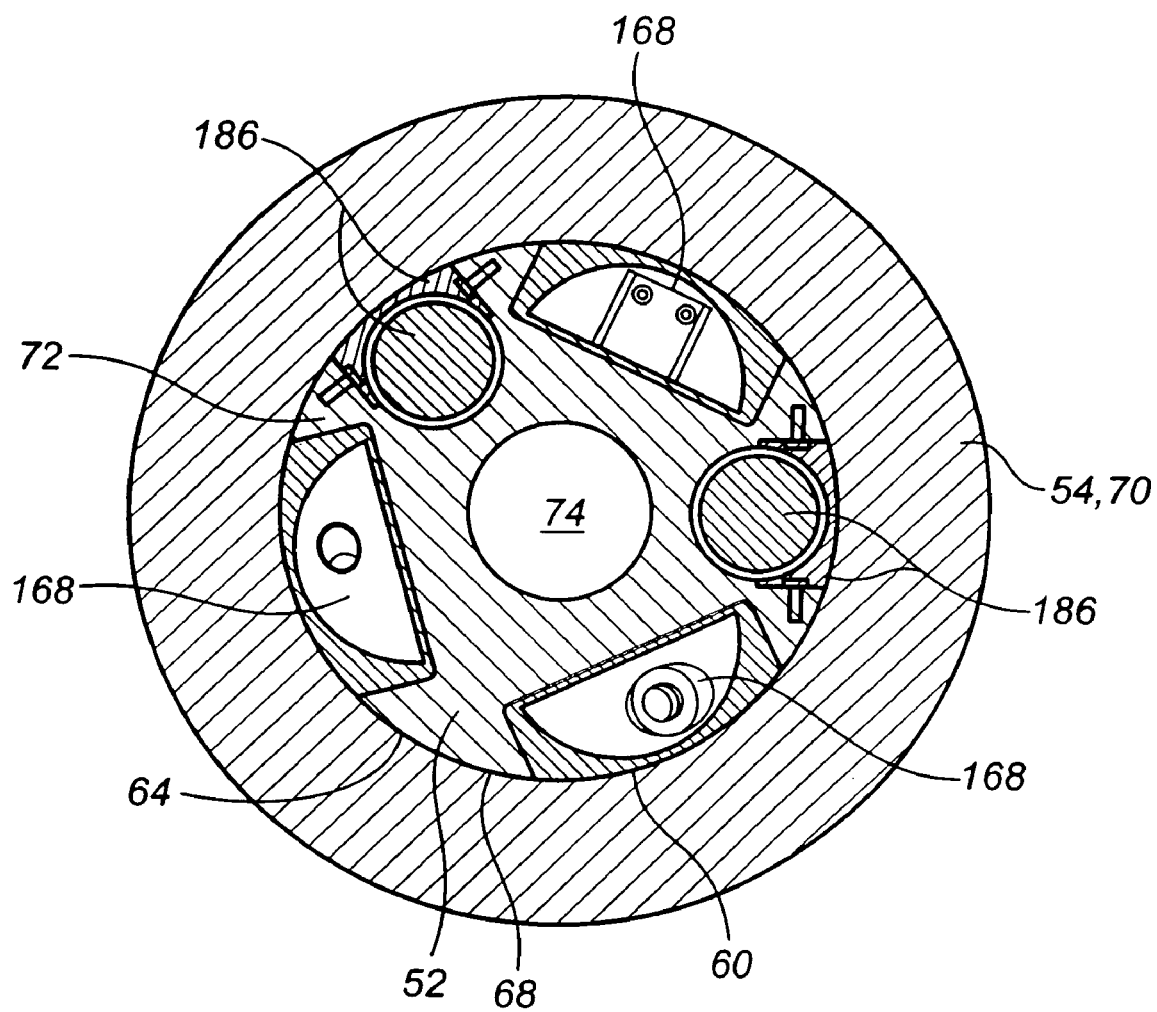
FIG. 9 is a cross-sectional view of a drill bit assembly taken along lines 9—9 of FIG. 8(c)

Referring to the Figures, particularly FIGS. 7(f) and 8(c), the drill bit (85) is shown schematically only. Any type or configuration of drill bit (85) suitable for performing the desired drilling operation may be used in the within system and method. For example, the drill bit (85) may be comprised of a polycrystalline diamond cutter ("PDC") bit, a roller cone bit, a long gage bit, a bit having straight or spiral blades or any other bit configuration compatible with the drilling operation to be performed. Additionally, the drill bit (85) may be comprised of a single integral member or element or it may be comprised of a plurality of members or elements connected, mounted or fastened together in any manner to provide the desired drill bit (85).

For instance, referring to FIGS. 7(f) and 8(c), the drill bit is shown schematically as reference number (85). The outer surface of the drill bit (85) may be formed or configured to include the necessary cutting blades and cutters. For instance, spiral or straight grooves may be machined into the outer surface and a crown or cutters may be mounted on the end surface. Alternately, the drill bit (85) may be comprised of an inner sleeve or sub having an outer sleeve mounted thereon which defines the spiral or straight grooves therein. Again, a crown or cutters, such as a roller cone, would also be mounted at the end of the outer sleeve.

Where desired, the drill bit assembly (46) may be further comprised of one or more subs, tools or further equipment (not shown) connected between the distal end (86) of the drive shaft (84) and the drill bit (85). The sub may include any further downhole tools or equipment, such as a stabilizer, collapsible stabilizer, adjustable stabilizer, reamer, underreamer, sensor, telemetry system, formation pressure tester, varying or fixed magnetic or electric field generator, acoustic transmitter into the formation for distance and direction ranging or seismic sensing, which are required for the particular drilling operation.

A proximal end (88) of the drive shaft (84) is threadably connected to a distal end (90) of a drive shaft cap (92). A proximal end (94) of the drive shaft cap (92) is threadably connected to a lower universal coupling (96). The lower universal coupling (96) is connected with a distal end (98) of a transmission shaft (100). A proximal end (102) of the transmission shaft (100) is connected with an upper universal coupling (104). The upper universal coupling (104) is threadably connected to a distal end (106) of a rotor (108). A proximal end (110) of the rotor (108) is connected to a distal end (112) of a flex rotor extension (114). The drive train (78) terminates at a proximal end (116) of the flex rotor extension (114).

Beginning at the lower end (32) of the drilling assembly (24), the housing (80) includes a drive shaft catcher nut (118). The drive shaft catcher nut (118) has a distal end (118) from which the drive shaft (84) extends or protrudes. A proximal end (122) of the drive shaft catcher nut (118) is threadably connected with a distal end (124) of a lower bearing housing (126). A proximal end (128) of the lower bearing housing (126) is threadably connected to a distal end (130) of a bearing housing (132). A proximal end (134) of the bearing housing (132) is threadably connected to a distal end (136) of a transmission unit housing (138). A proximal end (140) of the transmission unit housing (138) is threadably connected to a distal end (142) of a power unit housing (144). A proximal end (146) of the power unit housing (144) is threadably connected to a distal end (148) of a crossover sub housing (150). A proximal end (152) of the crossover sub housing (150) is threadably connected to a distal end (154) of an receiver sub housing (156). A proximal end (158) of the receiver sub housing (156) includes a threaded connection defining the upper end (30) of the drilling assembly (24) which is connected with the remainder of the drill string (20), particularly the surface communication system (26).

Further, the drilling assembly (24) defines a fluid pathway (74) therethrough from the upper end (30) to the lower end (32) of the drilling assembly (24). In this regard, each of the drive shaft (84) and the drill bit assembly (46) define a bore (160) therethrough such that fluid may pass into the bore (160) at the proximal end (88) of the drive shaft (84) through the drive shaft cap (92) and may exit out of the bore (160) at the lower end (32) of the drilling assembly (24) through the drill bit assembly (46). In addition, a conductive inner mandrel (162), which defines a portion of the fluid pathway (74) therethrough, is positioned or mounted within the bore (160) as described further below. In the preferred embodiment, the inner mandrel (162) has a distal end (164), which extends from the distal end (86) of the drive shaft (84) into the drill bit (85), and a proximal end (166), which extends from the proximal end (88) of the drive shaft (84) into the drive shaft cap (92).

The downhole end (82) of the drive train (78) is preferably comprised of at least a portion of the drive shaft (84), particularly its distal end (86), which extends from the housing (80). Thus, at least a portion of the axial conducting loop (22) is comprised of the drive shaft (84). Further, in the preferred embodiment, the downhole end (82) of the drive train (78) is further comprised of the drill bit assembly (46) which is connected with the drive shaft (84). Thus, in the preferred embodiment, at least a portion of the axial conducting loop (22) is comprised of the drill bit assembly (46). In other words, at least one of the first axial position (48) and the second axial position (50) is located in the drill bit assembly (46). Specifically, the first axial position (48) is preferably located in the drill bit assembly (46). In the preferred embodiment, the first axial position (48) is located in the drill bit (85).

Further, at least one sensor (168) is preferably located in the downhole end (82) of the drive train (78) so that the sensor (168) can provide information relating to downhole conditions or drilling parameters adjacent or in proximity to the downhole end (82) for communication by the axial conducting loop (22). Alternately, the axial conducting loop (22) may provide electrical power to the sensor (168). More preferably, at least one sensor (168) is located in the drill bit assembly (46). In the preferred embodiment, as described in detail below, at least one sensor (168) is located in the drill bit (85).

Each sensor (168) may be comprised of any sensor or sensing equipment, or combination of sensors or sensing equipment, which is capable of sensing and generating information regarding a desired downhole condition, drilling assembly (24) condition or drilling parameter. For example, the sensor (168) may provide information concerning one or more of the following: characteristics of the borehole or the surrounding formation including natural gamma ray, resistivity, density, compressional wave velocity, fast shear wave velocity, slow shear wave velocity, dip, radioactivity, porosity, permeability, pressure, temperature, vibration, acoustic, seismic, magnetic field, gravity, acceleration (angular or linear), magnetic resonance characteristics or fluid flow rate, pressure, mobility, or viscosity characteristics of a fluid within the borehole or the surrounding formation; drilling characteristics or parameters including the direction, inclination, azimuth, trajectory or diameter of the borehole or the presence of other proximate boreholes; and the condition of the drill bit (85) or other components of the downhole end (82) of the drive train (78) including weight-on-bit, drill bit temperature, torque on bit or the differential pressure across the bit.

In addition, the system is directed at communicating information between the axial positions (48, 50) by conducting the axial electrical signal embodying the information through the axial conducting loop (22) between the axial positions (48, 50). The axial electrical signal may be comprised of any varying electrical signal, including unipolar alternating current (AC) signals, bipolar AC signals and varying direct current (DC) signals. The axial electrical signal may vary as a wave, pulse or in any other manner. The axial electrical signal is a modulated signal which embodies the information to be communicated. The axial electrical signal may be modulated in any manner, such as for example by using various techniques of amplitude modulation, frequency modulation and phase modulation. Pulse modulation, tone modulation and digital modulation techniques may also be used to modulate the axial electrical signal. The specific characteristics of the axial electrical signal will depend upon the characteristics of a transmitter electrical signal, as discussed below.

In the preferred embodiment, a transmitter (170) transmits the information to the axial conducting loop (22) by creating the modulated axial electrical signal embodying the information. Similarly, in the preferred embodiment, a receiver (172) receives the information from the axial conducting loop (22) by receiving the axial electrical signal embodying the information.

The transmitter (170) gathers the information to be communicated and then incorporates the information into a modulated transmitter electrical signal embodying the information. The transmitter (170) may be coupled to the axial conducting loop (22) either directly or indirectly, as discussed below.

The transmitter electrical signal may be any varying electrical signal which is capable of creating the axial electrical signal, including unipolar alternating current (AC) signals, bipolar AC signals and varying direct current (DC) signals. The transmitter electrical signal may vary as a wave, pulse or in any other manner. The transmitter electrical signal is a modulated signal which embodies the information to be communicated. The transmitter electrical signal may be modulated in any manner, such as for example by using various techniques of amplitude modulation, frequency modulation and phase modulation. Pulse modulation, tone modulation and digital modulation techniques may also be used to modulate the transmitter electrical signal.

The transmitter (170) may be directly coupled to the axial conducting loop (22) by establishing a direct electrical connection between the transmitter (170) and the axial conducting loop (22), such as by a hardwire connection, so that the transmitter electrical signal becomes the axial electrical signal when it enters the axial conducting loop (22). The transmitter (170) may be indirectly coupled to the axial conducting loop (22) by any method or device, such as for example inductive coupling, LC coupling, RC coupling, diode coupling, impedance coupling or transformer coupling, with the result that the conducting of the transmitter electrical signal in the transmitter (170) induces the axial electrical signal in the axial conducting loop (22). In the preferred embodiment, the transmitter (170) is indirectly coupled to the axial conducting loop (22) by transformer coupling techniques.

In the preferred embodiment, the transmitter (170) includes a transmitter coil (174) which comprises a transmitter conductor (176) wound on a transmitter core (178). The transmitter coil (174) is preferably located in an electrically insulated annular transmitter space (180) within the drill bit (85) as described further below, adjacent to the first axial position (48). The transmitter core (178) is preferably magnetically permeable and is preferably toroidally shaped.

In the preferred embodiment the transmitter (170) further includes a transmitter processor (182) for receiving the information to be communicated and for generating the modulated transmitter electrical signal, a transmitter amplifier (184) for amplifying the transmitter electrical signal before it is sent to the transmitter coil (174), and a transmitter power supply (186) for providing electrical energy to the transmitter (170). The transmitter processor (182) may consist of one component or several components. The transmitter amplifier (184) may be part of the transmitter processor (182) or it may be separate therefrom.

Further, at least one sensor (168) is preferably electrically connected or coupled with the transmitter (170) in any suitable manner such that the sensor (168) provides the information to the transmitter (170). More particularly, the transmitter processor (182) receives the information from the sensor (168) and generates the modulated transmitter electrical signal therefrom. In the preferred embodiment, the sensor (168) is directly electrically connected or coupled with the transmitter (170), such as by a hardwire connection.

The receiver (172) receives the information from the axial conducting loop (22) and then incorporates the information into a modulated receiver electrical signal embodying the information. The receiver (172) may also be coupled to the axial conducting loop (22) either directly or indirectly.

The receiver electrical signal is a modulated signal which embodies the information being communicated. The receiver electrical signal may be modulated in any manner, such as for example by using various techniques of amplitude modulation, frequency modulation and phase modulation. Pulse modulation, tone modulation and digital modulation techniques may also be used to modulate the receiver electrical signal. The specific characteristics of the receiver electrical signal will depend upon the characteristics of the axial electrical signal.

The receiver (172) may be directly coupled to the axial conducting loop (22) by establishing a direct electrical connection between the receiver (172) and the axial conducting loop (22), such as by a hardwire connection, so that the axial electrical signal becomes the receiver electrical signal when it exits the axial conducting loop (22). The receiver (172) may be indirectly coupled to the axial conducting loop (22) by any method or device, such as for example inductive coupling, LC coupling, RC coupling, diode coupling, impedance coupling or transformer coupling, with the result that the conducting of the axial electrical signal in the axial conducting loop (22) induces the receiver electrical signal in the receiver (172). In the preferred embodiment, the receiver (172) is indirectly coupled to the axial conducting loop (22) by transformer coupling techniques.

In the preferred embodiment, the receiver (172) includes a receiver coil (188) which comprises a receiver conductor (190) wound on a receiver core (192). The receiver coil (188) is located in an electrically insulated annular receiver space (194) between the drive train (78) and the housing (80) adjacent to the second axial position (50). The receiver core (192) is preferably magnetically permeable and is preferably toroidally shaped so that it surrounds the drive train (78).

In the preferred embodiment the receiver (172) further includes a receiver processor (196) for processing the modulated receiver electrical signal, a receiver amplifier (198) for amplifying the receiver electrical signal after it is received from the axial conducting loop (22), and a receiver power supply (200) for providing electrical energy to the receiver (172). The receiver processor (196) may consist of one component or several components. The receiver amplifier (198) may be part of the receiver processor (196) or it may be separate therefrom.

As well, in the preferred embodiment, the receiver (172) is adapted to be electrically connected with the surface communication system (26). As a result, information communicated from the sensor (168) to the axial conducting loop (22) may subsequently be communicated further uphole or towards the surface by the surface communication system (26). The receiver (172) may be directly coupled to the surface communication system (26) by establishing a direct electrical connection between the receiver (172) and the surface communication system (26), such as by a hardwire connection. Alternately, the receiver (172) may be indirectly coupled to the surface communication system (26) by any method or device, such as for example inductive coupling, LC coupling, RC coupling, diode coupling, impedance coupling or transformer coupling.

In the preferred embodiment, the invention may be used to communicate information in both directions axially along the drill string (20). As a result, both a transmitter (170) and a receiver (172) may be located adjacent to each of the first axial position (48) and the second axial position (50). Alternatively, both the transmitter core (178) and the receiver core (192) may contain both transmitter conductor (176) windings and receiver conductor (190) windings, or as in the preferred embodiment, each of the transmitter (170) and the receiver (172) may function as a transceiver capable of both transmitting and receiving signals.

In the preferred embodiment, the downhole end (82) of the drive train (78) defines or includes at least a portion of the inner axial conductor (52), the outer axial conductor (54) and the electrical insulator (76) in the annular space (68) therebetween. The inner and outer axial conductors (52, 54) are electrically insulated with respect to each other to avoid a short circuit which would prevent a substantial portion of the axial electrical signal from being communicated between the axial positions (48, 50). Furthermore, the inner and outer axial conductors (52, 54) preferably provide a sufficient independent conducting path so that the axial electrical signal can be conducted between the axial positions (48, 50) without significant energy loss and while minimizing the diversion of the axial electrical signal into the surrounding formation during drilling operations. To this end, the connections between components of the inner axial conductor (52) are preferably made with minimal resistance so that the inner axial conductor (52) has a minimal overall resistance, and the connections between components of the outer axial conductor (54) are preferably made with minimal resistance so that the outer axial conductor (54) has a minimal overall resistance.

Similarly, the conductive connections (56, 58) at the first and second axial positions (48, 50) should be sufficiently conductive so that the axial electrical signal can be transferred between the inner and outer axial conductors (52, 54) without significant energy loss and while minimizing the diversion of the axial electrical signal into the surrounding formation during drilling operations. To this end, the conductive connections (56, 58) are constructed to have a minimal resistance so that the axial conducting loop (22) has a minimal overall resistance.

As stated, the downhole end (82) of the drive train (78) defines or includes at least a portion of the inner axial conductor (52), the outer axial conductor (54) and the electrical insulator (76) in the annular space (68) therebetween. In the preferred embodiment, the downhole end (82) of the drive train (78) is comprised of a first outer axial conductor (202), a first inner axial conductor (204) and the electrical insulator (76). The outer axial conductor (54) described previously is comprised of the first outer axial conductor (202) and the inner axial conductor (52) described previously is comprised of the first inner axial conductor (204) such that at least a portion of the axial conducting loop (22) is comprised of the first outer axial conductor (202) and the first inner axial conductor (204).

In greater detail, referring to the downhole end (82) of the drive train (78), the first outer axial conductor (202) defines the inner circumferential surface (60) which further defines the outer conductor longitudinal axis (62), particularly, a first outer conductor longitudinal axis (206). Similarly, the first inner axial conductor (204) defines the outer circumferential surface (64) which further defines the inner conductor longitudinal axis (66), particularly, a first inner conductor longitudinal axis (208). The first inner axial conductor (208) is fixedly connected within the first outer axial conductor (206) such that the annular space (68) is defined between the outer circumferential surface (64) and the inner circumferential surface (60) and such that the first outer conductor longitudinal axis (206) and the first inner conductor longitudinal axis (208) are substantially coincidental. Finally, the electrical insulator (76) is disposed within the annular space (68).

In the preferred embodiment, a further portion of the axial conducting loop (22) is formed by the drill string (20), and specifically the drilling assembly (24), above the downhole end (82) of the drive train (78). More particularly, the further portion of the axial conducting loop (22) above the downhole end (82) of the drive train (78) is comprised of a second outer axial conductor (210) and a second inner axial conductor (212). In the preferred embodiment, the second outer axial conductor (210) is comprised of the housing (80) and the second inner axial conductor (212) is comprised of the drive train (78) rotatably supported within the housing (80). The second outer and inner axial conductors (210, 212) may be co-axial as described for the first outer and inner axial conductors (202, 204) where desired.

In order to provide the axial conducting loop (22), the first outer axial conductor (202) is preferably electrically connected with the second outer axial conductor (210) and the first inner axial conductor (204) is preferably electrically connected with the second inner axial conductor (212). Although any type of direct or indirect electrical connection may be provided, a direct electrical connection is preferred.

In the preferred embodiment, the first axial position (48) and the first conductive connection (56) are located in the drill bit (85) and the second axial position (50) and the second conductive connection (58) are located in the receiver sub (34). As a result, the axial conducting loop (22) is formed by the drilling assembly (24) and includes portions of the drill bit assembly (46), the lower bearing sub (44), the bearing sub (42), the transmission unit (40), the power unit (38), the crossover sub (36) and the receiver sub (34), with the result that the axial electrical signal is communicated between a location in the drill bit assembly (46) below the downhole or distal end (266) of the housing (80) and a location within the housing (80) preferably above the power unit (38).

Thus, the components of the preferred embodiment of the drilling assembly (24), including the inner and outer axial conductors (52, 54), will be described in detail, beginning with the drill bit assembly (46) at the lower end (32) of the drilling assembly (24) and moving towards the upper end (30) of the drilling assembly (24).

The drill bit assembly (46) is comprised of the drill bit (85). The drill bit (85) includes an outer drill collar (214) surrounding and enclosing various inner components or elements of the drill bit (85) including an electronics insert (216), a drive shaft seal assembly (218) and an electrical connection assembly (220). As discussed above, the outer surface of the outer drill collar (214) may be machined to include the blades and cutters or a crown may be affixed to the distal end (222) for drilling the borehole. Alternately, the outer drill collar (214) may be used as a sub for affixing or fastening a sleeve thereto, which defines the blades and which permits the mounting of cutters or a crown thereon.

The inner components of the drill bit (85) define a portion of the fluid pathway (74) therethrough. More particularly, the drill collar includes a distal end (222), a proximal end (224) and an inner circumferential surface (226). The fluid pathway (74) exits through the distal end (222) of the drill collar (214). The inner circumferential surface (226) of the drill collar (214) at the proximal end (224) is threadably connected with the adjacent end of the drive shaft (84). Further, the inner circumferential surface (226) defines a cavity (228) therein for receipt of the inner components of the drill bit (85).

The electronics insert (216) has a distal end (230), a proximal end (232) and defines a bore (234) therethrough providing a portion of the fluid pathway (74). Further, the electronics insert (216) defines one or more chambers (236) therein about its outer surface such that each chamber (236) is enclosed when the electronics insert (216) is mounted within the cavity (228) of the drill collar (214). Each chamber (236) is provided for containing one or more sensors (168). Further, where desired, the chamber (236) may be provided for containing one or more of the components comprising the transmitter (170) including the transmitter processor (182), the transmitter amplifier (184) and the transmitter power supply (186) or battery. Each of the sensors (186) is thus contained and held in position within the chamber (236) between the inner circumferential surface (226) of the drill collar (214) and the electronics insert (216).

In the preferred embodiment, the transmitter (170) is contained within the drill collar (214) in the annular space (180) which is defined between the inner circumferential surface (226) of the drill collar (214) and the electronics insert (216) adjacent its distal end (230). More particularly, the transmitter coil (174) is contained in the electrically insulated annular transmitter space (180). The annular transmitter space (180) may be insulated with any material which will serve to isolate the transmitter coil (174) electrically from the surrounding parts of the drill bit (85) thus preventing any short circuiting. In the preferred embodiment, the annular transmitter space (180) is insulated with one or a combination of air, foam or a potting material. The annular transmitter space (180) is also preferably completely enclosed so that the transmitter coil (174) is isolated and thus protected from the formation pressure during drilling operations.

The transmitter processor (182), the transmitter amplifier (184) and the transmitter power supply (186) are preferably located within one or more chambers (236) of the electronics insert (216). The components of the transmitter (170) as described herein and the sensors (168) are electronically connected by a direct hardwire connection.

The electronics insert (216) is preferably sealed within the drill collar (214) by one or more seals or sealing assemblies. In the preferred embodiment, one or more annular seals (238), such as 0-rings, are provided about the distal end (230) of the electronics insert (216) for sealing between the electronics insert (216) and the drill collar (214). The drive shaft seal assembly (218) is provided adjacent the proximal end (232) of the electronics insert (216) and defines a bore (240) therethrough comprising a portion of the fluid pathway (74).

Further, the annular space (68) is provided between the inner circumferential surface (226) of the drill collar (214) and the electronics insert (216). The electrical insulator (76) is preferably provided in the annular space (68), particularly between the inner circumferential surface (226) and the electronics insert (216) at the location of the chambers (236). The electrical insulator (76) is particularly provided along the interface between the drill collar (214) and the electronics insert (216). However, an electrical connection or electrical contact between the drill collar (214) and the electronics insert (216) is permitted at the distal end (230) of the electronics insert (216) such that the axial electrical signal may be communicated or transmitted between the electronics insert (216) and the drill collar (214). In the preferred embodiment, this contact or connection defines the first axial position (48).

A proximal end (242) of the drive shaft seal assembly (218) is comprised of an annular seal carrier (244) including at least one seal (238) about its outer circumferential surface and at least one seal (238) about the inner bore (240). A further connector seal (246) may be provided at its uppermost and lowermost ends for sealing with the adjacent components. In addition, in the preferred embodiment, the seal carrier (244) is insulating or is comprised of an insulating material. In particular, the seal carrier (244) is comprised of a pin insulator. When assembled, the seal carrier (244) is contained or positioned within the distal end (86) of the drive shaft (84) or the bit box (87) between the drive shaft (84) and the inner mandrel (162). Thus, the seal carrier (244) may comprise a portion of the electrical insulator (76), providing insulation between the distal end (86) of the drive shaft (84) and the inner mandrel (162).

The drive shaft seal assembly (218) is further comprised of a seal spacer (248) positioned between the proximal end (232) of the electronics insert (216) and the distal end (86) of the drive shaft (84). Again, preferably, the seal spacer (248) includes one or more annular seals (238) about its inner and outer circumferential surfaces. In addition, in the preferred embodiment, the seal spacer (248) is also insulating or is comprised of an insulating material. In particular, the seal spacer (248) is comprised of an insert insulator. When assembled, the seal spacer (248) is contained or positioned between the proximal end (232) of the electronics insert (216) and the distal end (86) of the drive shaft (84). Thus, the seal spacer (248) may also comprise a portion of the electrical insulator (76), providing further insulation between the adjacent proximal end (232) of the electronics insert (216) and the distal end (86) of the drive shaft (84).

In the preferred embodiment, the distal end (164) of the conductive inner mandrel (162) extends within the proximal end (224) of the drill collar (214), and more particularly, extends within the bore (240) of the drive shaft seal assembly (218) through its proximal end (242). As will be described in further detail below, the axial electrical signal is conducted through the inner mandrel (162) and to the electronics insert (216).

In order to facilitate the transmission of the axial electrical signal through the drive train (78) and to facilitate a "wet connection" of the adjacent components, an electrical connection assembly (220) may be provided. Specifically, one or more electrical connection assemblies (220) as described may be provided where necessary to facilitate the electrical connection of various components arranged in series to comprise the drive train (78). Further, the electrical connection assembly (220) may be modified to accommodate the connection of various components comprising a plurality of parallel axial conducting loops (22) spaced about the drill string (20). In particular, it has been found that up to four parallel axial conducting loops (22) may be spaced about the components of the drill string (20). In this instance, the electrical connection assembly (220) permits the concurrent or simultaneous connection and disconnection of the components of each of the axial conducting loops (22).

In the preferred embodiment, a lower electrical connection assembly (221) and an upper electrical connection assembly (223) are preferably provided for a single axial conducting loop (22). Further, an electrical connection assembly (220), as described herein, may be utilized in any known or conventional rotary shouldered connection. The electrical connection assembly (220), as described, may be utilized to provide an electrical connection through the rotary shouldered connection. The electrical connection assembly (220) is further able to provide a relatively reliable wet electrical connection, such as in a drilling fluid environment, through the rotary shouldered connection and through one or more portions of the drive train (78).

The lower electrical connection assembly (221) facilitates the electrical connection or contact between the distal end (164) of the conductive inner mandrel (162) and the electronics insert (216). The upper electrical connection assembly (223) facilitates the electrical connection or contact between the proximal end (166) of the conductive inner mandrel (162) and the drive shaft cap (92). Although the specific configuration and components of each of the lower and upper electrical connection assemblies (221, 223) may differ, the actual elements or characteristics which enhance the electrical contact are similar, as described herein.

The lower electrical connection assembly (221) is comprised of an annular contact sleeve (250) or annular contact holder defining a bore (252) therethrough which provides a portion of the fluid pathway (74). The contact sleeve (250) is positioned between the proximal end (232) of the electronics insert (216) and the seal carrier (244) of the drive shaft seal assembly (218). The lower electrical connection assembly (221) facilitates or enhances the transmission of the axial electrical signal between the conductive inner mandrel (162) extending from the drive shaft (84) and the electronics insert (216). Thus, the lower electrical connection assembly (221), including the contact sleeve (250), are adapted for receipt or insertion of the distal end (164) of the inner mandrel (162) therein. More particularly, the distal end (164) of the inner mandrel (162) is received or inserted within the bore (252) of the contact sleeve (250). Preferably, the contact sleeve (250) permits the distal end (164) of the inner mandrel (162) to be readily connected with and disconnected from the lower electrical connection assembly (221).

Preferably, the bore (240) of the drive shaft seal assembly (218) at the seal carrier (244) and at least a portion of the bore (252) of the contact sleeve (250) are sized and configured for closely receiving the distal end (164) of the inner mandrel (162) therein. The close fit or close proximity of the inner mandrel (162) and the bore (240) of the seal carrier (244) enhances or facilitates the sealing action or operation of the seals (238) between the seal carrier (244) and the inner mandrel (162). The close fit or close proximity of the inner mandrel (162) and the bore (252) of the contact sleeve (250) enhances or facilitates the electrical connection or conductivity between the inner mandrel (162) and the contact sleeve (250).

In addition, to assist with the ready connection with the contact sleeve (250), the lower electrical connection assembly (221) is preferably further comprised of a biasing mechanism or device for urging the contact sleeve (250) uphole or in a direction towards the distal end (164) of the inner mandrel (162). Although any biasing mechanism or device, or combination of such mechanisms or devices, may be used, in the preferred embodiment, the lower electrical connection assembly (221) is comprised of an annular contact spring (254). Preferably, an outer surface (256) of the contact sleeve (250) is shaped or configured to define a downwardly facing shoulder (258). The annular contact spring (254) is positioned about the outer surface (256) of the contact sleeve (250) downhole of the downwardly facing shoulder (258). As a result, the contact spring (254) acts upon the downwardly facing shoulder (258) of the contact sleeve (250) and the proximal end (232) of the electronics insert (216). Accordingly, the contact spring (254) urges the contact sleeve (250) away from the electronics insert (216) and thus, towards the inner mandrel (162).

Additionally, the lower electrical connection assembly (221) is preferably further comprised of at least one, and preferably a plurality, of biased contact members (260) associated with the bore (252) of the contact sleeve (250) which enhance or facilitate the electrical connection or contact between the inner mandrel (162) and the contact sleeve (250). Each contact member (260) is mounted, connected or otherwise associated with the bore (252) of the contact sleeve (250) and is biased or urged away from the bore (252) for contact with the inner mandrel (162). Although any biased member or members capable of enhancing the electrical contact may be used, each biased contact member (260) is preferably comprised of a contact spring. Further, preferably, the bore (252) of the contact sleeve (250) is shaped or configured to define an upwardly facing shoulder (262). The contact members (260) or contact springs are positioned about the bore (252) of the contact sleeve (250) uphole of the upwardly facing shoulder (262). As a result, the contact members (260) or contact springs are positioned between the upwardly facing shoulder (262) of the contact sleeve (250) and the seal carrier (244).

Further, each contact member (260) or contact spring is adapted to receive the distal end (164) of the inner mandrel (162) therein as the inner mandrel (162) is inserted in the bore (252) of the contact sleeve (250). As well, each contact member (260) or contact spring is shaped or configured to enhance the contact between the contact member (260) and the inner mandrel (162), while still permitting ready connection and disconnection of the inner mandrel (162). Preferably, each contact member (260) or contact spring defines or includes a jutting or protruding abutment portion (264) which extends or protrudes inwardly towards the inner mandrel (162) for abutment and closer contact with the inner mandrel (162). In the preferred embodiment, each contact member (260), being a contact spring, is biased to urge the abutment portion (264) into closer contact with the inner mandrel (162), while still permitting the insertion of the inner mandrel (162) within the contact members (260) and the removal or disengagement of the inner mandrel (162) from the contact members (260).

Further, as described, the proximal end (122) of the drive shaft catcher nut (118) is threadably connected with the distal end (124) of the lower bearing housing (126). The drive shaft catcher nut (118) surrounds the drive shaft (84) as it exits a distal end (266) of the housing (80) and contains a split ring (268) in an annular space between the drive shaft catcher nut (118) and the drive shaft (84). Preferably, the drive shaft (84) includes an outwardly extending shoulder (270) which cooperates with the split ring (268) to assist with maintaining the longitudinal position of the drive shaft (84) within the housing (80).

As previously described, the lower bearing sub (44) includes the lower bearing housing (126) which is threadably connected with the drive shaft catcher nut (118). The lower bearing housing (126) surrounds the drive shaft (84) and contains a bearing assembly (272) in an annular space between the lower bearing housing (126) and the drive shaft (84). The bearing assembly (272) may be comprised of one type or a combination of types of bearings including radial and thrust bearings. In the preferred embodiment, the bearing assembly (274) is comprised of a lower radial bearing (274) and one or more thrust bearings (276). The lower radial bearing (274) is fixed to and rotates with the drive shaft (84) and functions to rotatably support the drive train (78) in the housing (80). The thrust bearing (276) functions to axially support the drive train (78) in the housing (80). The distal end (86) of the drive shaft (84) extends through the distal end (124) of the lower bearing housing (126) and the proximal end (88) of the drive shaft (84) extends within the drive shaft cap (92).

The conductive inner mandrel (162) is fixedly connected within the bore (160) of the drive shaft (84) such that a portion of the annular space (68) is defined between the inner mandrel (162) and the bore (160). The inner mandrel (162) extends from the distal end (164), which is electrically connected with the lower electrical connection assembly (221) and the electronics insert (116), to the proximal end (166), which is electrically connected with the upper electrical connection assembly (223) and the drive shaft cap (92). In order to inhibit or prevent any short circuiting of the axial electrical signal between the inner mandrel (162) and the adjacent drive shaft (84), the electrical insulator (76) is preferably disposed within the annular space (68) therebetween.

In the preferred embodiment, the lower bearing sub (44) is connected to the bearing sub (42) in the manner as previously described. The bearing sub (42) includes the bearing housing (132). The proximal end (88) of the drive shaft (84) extends into the distal end (130) of the bearing housing (132) where it connects with the distal end (90) of the drive shaft cap (92) such that the drive shaft (84) and the drive shaft cap (92) may rotate together or as a unit. The proximal end (94) of the drive shaft cap (92) extends from the proximal end (134) of the bearing housing (132). Thus, the bearing housing (132) surrounds the drive shaft cap (92) such that the drive shaft cap (92) is permitted to rotate therein and such that an annular space (278) is formed or provided between the bearing housing (132) and the drive shaft cap (92).

Figure 10:
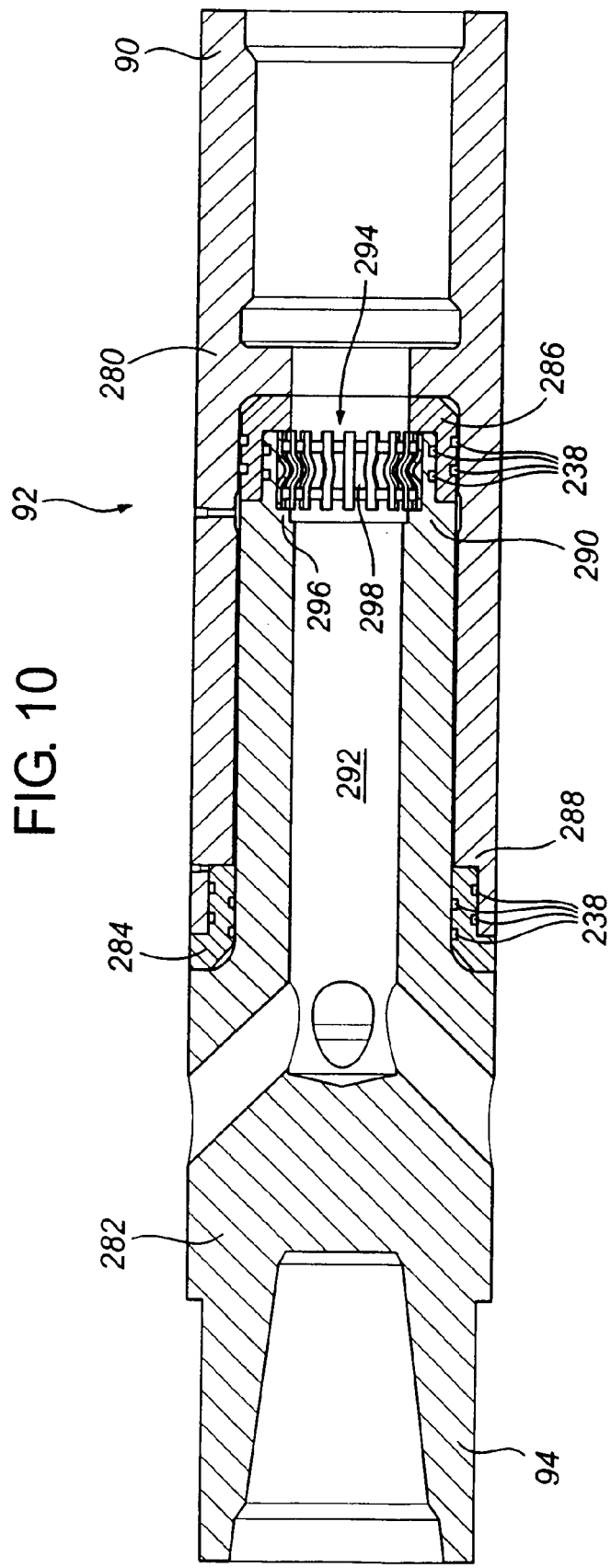
FIG. 10 is a more detailed longitudinal sectional view of the portion of the drive train shown in FIG. 8(a).

Referring to FIGS. 7(e), 8(a) and 10, the drive shaft cap (92) is adapted for the receipt or insertion of the proximal end (166) of the inner mandrel (162) therein. Further, in order to enhance or facilitate an electrical connection or contact between the proximal end (166) of the inner mandrel (162) and the drive shaft cap (92), the drive shaft cap (92) is preferably comprised of the upper electrical connection assembly (223).

More particularly, the drive shaft cap (92) is comprised of a drive shaft cap sleeve (280) comprising the distal end (90) of the drive shaft cap (92) and a drive shaft cap mandrel (282) comprising the proximal end (94) of the drive shaft cap (92). The drive shaft cap sleeve (280) and the drive shaft cap mandrel (282) are connected or affixed together, preferably by a threaded connection therebetween. Further, the drive shaft cap (92) also preferably includes at least one sealing assembly for sealing the connection between the drive shaft cap sleeve and mandrel (280, 282).

In the preferred embodiment, the drive shaft cap (92) is comprised of an upper seal carrier (284) and a lower seal carrier (286). The upper seal carrier (284) is positioned adjacent or in proximity to a proximal end (288) of the drive shaft cap sleeve (280) for sealing between the proximal end (288) and the adjacent surface of the drive shaft cap mandrel (282). The lower seal carrier (286) is positioned adjacent or in proximity to a distal end (290) of the drive shaft cap mandrel (282) for sealing between the distal end (290) and the adjacent surface of the drive shaft cap sleeve (280). Each of the upper and lower seal carriers (284, 286) may include one or more one seals (238) about either or both of its outer circumferential surface and its inner circumferential surface.

In addition, in the preferred embodiment, each of the upper and lower seal carriers (284, 286) is insulating or is comprised of an insulating material. As well, an insulating material is preferably provided in the interface between the drive shaft cap sleeve and mandrel (280, 282) at the threaded connection. Thus, when assembled, some insulation is preferably provided between the drive shaft cap sleeve and mandrel (280, 282).

The upper electrical connection assembly (223) is comprised of the distal end (290) of the drive shaft cap mandrel (282), which functions similarly to the contact sleeve (250) of the lower electrical connection assembly (221). The upper electrical connection assembly (223) facilitates or enhances the transmission of the axial electrical signal between the conductive inner mandrel (162) extending from the drive shaft (84) and drive shaft cap mandrel (282) of the drive shaft cap (92). Thus, the upper electrical connection assembly (223), including the distal end (290) of the drive shaft cap mandrel (282), is adapted for receipt or insertion of the proximal end (166) of the inner mandrel (162) therein. More particularly, the proximal end (166) of the inner mandrel (162) is received or inserted within a bore (292) of the drive shaft cap mandrel (282), which bore (292) comprises a portion of the fluid pathway (74). Preferably, the distal end (290) of the drive shaft cap mandrel (282) permits the proximal end (166) of the inner mandrel (162) to be readily connected with and disconnected from the upper electrical connection assembly (223).

Preferably, the bore (292) of the drive shaft cap mandrel (282) at its distal end (290) is sized and configured for closely receiving the proximal end (166) of the inner mandrel (162) therein. The close fit or close proximity of the inner mandrel (162) and the bore (292) enhances or facilitates the electrical connection or conductivity between the inner mandrel (162) and the distal end (290) of the drive shaft cap mandrel (282).

In addition, the upper electrical connection assembly (223) is preferably further comprised of at least one, and preferably a plurality, of biased contact members (294) similar to the contact members (260) of the lower electrical connection assembly (221). The biased contact members (294) are associated with the bore (292) of the distal end (290) of the drive shaft cap mandrel (282) and enhance or facilitate the electrical connection or contact between the inner mandrel (162) and the distal end (290). Each contact member (294) is mounted, connected or otherwise associated with the bore (292) of the distal end (290) of the drive shaft cap mandrel (282) and is biased or urged away from the bore (292) for contact with the inner mandrel (162).

Although any biased member or members capable of enhancing the electrical contact may be used, each biased contact member (294) is preferably comprised of a contact spring. Further, preferably, the bore (292) of the distal end (290) of the drive shaft cap mandrel (282) is shaped or configured to define downwardly facing shoulder (296). The contact members (294) or contact springs are positioned about the bore (292) of the distal end (290) downhole of the downwardly facing shoulder (296). As a result, the contact members (294) or contact springs are positioned between the downwardly facing shoulder (296) of the distal end (290) of the drive shaft cap mandrel (282) and the lower seal carrier (286).

Further, each contact member (294) or contact spring is adapted to receive the proximal end (166) of the inner mandrel (162) therein as the inner mandrel (162) is inserted in the bore (292) of the distal end (290) of the drive shaft cap mandrel (282). As well, each contact member (294) or contact spring is shaped or configured to enhance the contact between the contact member (294) and the distal end (290) while still permitting ready connection and disconnection of the inner mandrel (162). Preferably, each contact member (294) or contact spring defines or includes a jutting or protruding abutment portion (298) which extends or protrudes inwardly towards the inner mandrel (162) for abutment and closer contact with the inner mandrel (162). In the preferred embodiment, each contact member (294), being a contact spring, is biased to urge the abutment portion (298) into closer contact with the inner mandrel (162), while still permitting the insertion of the inner mandrel (162) within the contact members (294) and the removal or disengagement of the inner mandrel (162) from the contact members (294).

Preferably, the first inner axial conductor (204) and the first outer axial conductor (202) are comprised of portions or components of the drive train (78) below or downhole of the bearing assembly (272) within the lower bearing housing (126). In the preferred embodiment, the first inner axial conductor (204) and the first outer axial conductor. (202) are comprised of the downhole end (82) of the drive train (78), particularly that portion extending from the housing (80). Further, the second inner axial conductor (212) and the second outer axial conductor (210) are comprised of portions or components of the drive train (78) and the housing (80). In the preferred embodiment, the second inner axial conductor (212) is comprised of the drive train above the downhole end (82), and preferably above the bearing assembly (272), while the second outer axial conductor (210) is comprised of the housing (80).

In greater detail, the first inner axial conductor (204) is comprised of the conductive inner mandrel (162), the lower electrical connection assembly (221) and the electronics insert (216). The first inner axial conductor (204) defines the fluid pathway (74) for conducting a fluid therethrough. The first outer axial conductor (202) is comprised of the drive shaft (84), the bit box (87) and the drill collar (214). The first inner axial conductor (204) is fixedly connected within the first outer axial conductor (202) such that the annular space (68) is defined therebetween and such that the first inner conductor longitudinal axis (208) and the first outer conductor longitudinal axis (208, 206) are substantially coincidental. At least a portion of the axial conducting loop (22) is preferably comprised of the first inner and outer axial conductors (204, 202).

In the preferred embodiment, the first axial position (48) is defined by the first conductive connection (58), which is a location of electrically conductive interface between the drill collar (214) and the electronics insert (216) at or adjacent the distal end (222) of the drill collar (214) of the drill bit (85). At the first conductive connection (58), the axial electrical signal is able to move between the drill collar (214) and the electronics insert (216) without encountering significant resistance.

In the preferred embodiment, the purpose of the transmitter (170) is to induce from the transmitter electrical signal the axial electrical signal in the axial conducting loop (22). As a result, preferably the axial conducting loop (22) extends through the transmitter coil (174) in order to maximize the exposure of the axial conducting loop (22) to the varying magnetic flux created by the transmitter electrical signal. The transmitter coil (174) may, however, be positioned at any location relative to the axial conducting loop (22) which results in exposure of the axial conducting loop (22) to the varying magnetic flux.

The preferred result is achieved in the preferred embodiment by providing electrical insulation, and particularly the electrical insulator (76) between the components comprising the first inner and outer axial conductors (204, 202), as described above, from the location of the bearing assembly (272) to the first axial position (48). In particular, the electrical insulator (76) is provided along the interface between the first inner and outer axial conductors (204, 202), and specifically, within the annular space (68) located above the transmitter (170).

Any manner or type of electrical insulator (76) may be used. However, preferably, the electrical insulator (76) is comprised of a layer of an electrically insulative material disposed within the annular space (68). In the preferred embodiment, the electrical insulator (76) is comprised of a non-conductive or insulative coating of the electrically insulative material which is applied to one or both of the first inner and outer axial conductors (204, 202) in the annular space (68). Any non-conductive or insulative coating may be used. For instance, the coating may be comprised of either an epoxy coating or a Teflon (trademark) coating. In the preferred embodiment, the coating is comprised of a hardened epoxy resin.

As indicted, in the preferred embodiment, the second inner axial conductor (212) is comprised of the drive train above the downhole end (82), and preferably above the bearing assembly (272), while the second outer axial conductor (210) is comprised of the housing (80).

Thus, in greater detail, the second inner axial conductor (212) is comprised of the proximal end (88) of the drive shaft (84), the drive shaft cap (92), the lower universal coupling (96), the transmission shaft (100), the upper universal coupling (104), the rotor (108) and the flex rotor extension (114). The second outer axial conductor (210) is comprised of the lower bearing housing (126), the bearing housing (132), the transmission unit housing (138), the power unit housing (144), the crossover sub housing (150) and the receiver sub housing (156). At least a further portion of the axial conducting loop (22) is preferably comprised of the second inner and outer axial conductors (212, 210).

In the preferred embodiment, the bearing sub (42) is connected to the transmission unit (40) in the manner as previously described. The proximal end (94) of the drive shaft cap (92) extends into the distal end (136) of the transmission unit housing (138) and the distal end (106) of the rotor (108) extends into the proximal end (140) of the transmission unit housing (138). The rotor (108) and the drive shaft cap (92) are connected to each other in the transmission unit housing (138) by the transmission shaft (100) and the upper and lower universal couplings (104, 96).

The transmission unit (40) forms part of the axial conducting loop (22). The transmission unit housing (138) forms a portion of the second outer axial conductor (210). The drive shaft cap (92), the lower universal coupling (96), the transmission shaft (100), the upper universal coupling (104) and the rotor (108) form a portion of the second inner axial conductor (212).

The transmission unit housing (138) is preferably electrically isolated from the drive train (78) components which pass through the transmission unit housing (138) in order to prevent a short circuit of the axial electrical signal between the axial positions (48, 50). This electrical isolation is achieved in the preferred embodiment by providing electrical insulation between the transmission unit housing (138) and the drive train (78) components passing therethrough. Any manner or type of insulation may be used. Preferably, a fluid gap is provided between the inner surface of the transmission unit housing (138) and the adjacent outer surfaces of the transmission shaft (100) and the drive shaft cap (92). Alternatively, the insulation, or a portion thereof, may be comprised of a non-conductive coating applied to one or both of the adjacent surfaces. Any non-conductive coating may be used. For instance, the non-conductive coating may be comprised of either an epoxy coating or a Teflon (trademark) coating. A non-conductive coating may be required where the drilling operation involves highly conductive drilling fluids.

In the preferred embodiment, the transmission unit (40) is connected to the power unit (38). The distal end (106) of the rotor (108) extends into the proximal end (140) of the transmission unit housing (138) and the distal end (112) of the flex rotor extension (114) extends into the proximal end (146) of the power unit housing (144). The rotor (108) and the flex rotor extension (114) are connected to each other in the power unit housing (144).

The power unit (38) also forms part of the axial conducting loop (22). The power unit housing (144) forms a portion of the second outer axial conductor (210). The rotor (108) and the flex rotor extension (114) form a portion of the second inner axial conductor (212). In the preferred embodiment the power unit (38) is comprised of a positive displacement motor (PDM). The power unit (38) may, however, be comprised of other types of motor, such as for example a turbine type motor.

In the preferred embodiment where the power unit (38) is comprised of a positive displacement motor, the power unit housing (144) contains a stator (300). The stator (300) comprises an elastomeric helical sleeve which is fixed to the interior surface of the power unit housing (144) and surrounds the rotor (108). The rotor (108) is also helical in shape and is rotated in the stator (300) by pressure exerted on the rotor (108) by drilling fluids which are passed through the interior of the drilling assembly (24) during drilling operations.

The power unit housing (144) is electrically isolated from the drive train (78) components which pass through the power unit housing (144) in order to prevent a short circuit of the axial electrical signal between the axial positions (48, 50). Electrical isolation of the rotor (108) relative to the power unit housing (144) in the vicinity of the stator (300) is achieved by constructing the stator (300) from an electrically insulating elastomeric material. Electrical isolation of the rotor (108) relative to the power unit housing (144) other than in the vicinity of the stator (300) is achieved by providing electrical insulation between the rotor (108) and the power unit housing (144). Again, any manner or type of insulation may be used. Preferably, a fluid gap, as described above, is provided between the outer surface of the rotor (108) and the inner surface of the power unit housing (144). Alternatively, the insulation, or a portion thereof, may be comprised of a non-conductive coating, as described above, applied to one or both of the adjacent surfaces. Again, a non-conductive coating may be required where the drilling operation involves highly conductive drilling fluids.

In the preferred embodiment, the crossover sub (36) is connected to the power unit (38). The flex rotor extension (114) extends through the entire length of the crossover sub (36). The purpose of the crossover sub (36) is to adapt the threaded connection at the proximal end (146) of the power unit housing (144) to the threaded connection at the distal end (154) of the receiver sub housing (156). The crossover sub (36) also forms part of the axial conducting loop (22). The crossover sub housing (150) forms a portion of the second outer axial conductor (210). The flex rotor extension (114) forms a portion of the second inner axial conductor (212).

The crossover sub housing (150) is electrically isolated from the drive train (78) components which pass through the crossover sub housing (150) in order to prevent a short circuit of the axial electrical signal between the axial positions (48, 50). In the preferred embodiment this electrical isolation is achieved by coating the flex rotor extension (114) with an electrically insulating material. The coating may be comprised of any insulating material, such as epoxy or Teflon (trademark). However, in the preferred embodiment, the coating is comprised of a silica impregnated Teflon (trademark) coating. Alternatively, where the drilling fluid is not highly conductive, the electrical isolation may be achieved by a fluid gap, as described above.

In the preferred embodiment, the receiver sub (34) is connected to the crossover sub (36). The proximal end (116) of the flex rotor extension (114) extends into the distal end (154) of the receiver sub housing (156) and terminates within the receiver sub (34). The distal end (154) of the receiver sub housing (156) contains the upper portion of the axial conducting loop (22), while the proximal end (158) of the receiver sub housing (156) provides an upper electronics hanger (302).

The receiver (172) is contained within the receiver sub housing (156). The receiver coil (188) is contained in the electrically insulated annular receiver space (194) between the receiver sub housing (156) and the flex rotor extension (114). The annular receiver space (194) may be insulated with any material which will serve to isolate the receiver coil (188) electrically from the surrounding parts of the receiver sub (34), thus preventing a short circuit between the receiver conductor (190) and the receiver sub (34). In the preferred embodiment, the annular receiver space (194) is insulated with one or a combination of air, foam or a potting material. The annular receiver space (194) is also preferably completely enclosed so that the receiver coil (188) is isolated and thus protected from the formation pressure during drilling operations.

The receiver processor (196), the receiver amplifier (198) and the receiver power supply (200) are located in the receiver sub (34) in the upper electronics hanger (302). An upper instrument cavity (304) is provided in the upper electronics hanger (302) to contain these components. The receiver conductor (190) feeds into the upper instrument cavity (304). One or more sensors may be electrically connected with the upper instrument cavity (304) in order to provide the receiver (172) with information for communication to the transmitter (170) via the axial conducting loop (22). Alternately, the receiver processor (196), the receiver amplifier (198) and the receiver power supply (200) may be located or positioned in a sonde (not shown) above the upper electronics hanger (302).

In addition, the receiver (172) is adapted to be electrically connected with the surface communication system (26), preferably at a proximal end (306) of the upper electronics hanger (302), so that information received by the receiver (172) from the transmitter (170) via the axial conducting loop (22) can be communicated from the receiver (172) to the surface communication system (26) and so that information received by the receiver (172) from the surface communication system (26) can be communicated to the transmitter (170) via the axial conducting loop (22). Specifically, a surface communications uplink cavity (308) is provided in the proximal end (306) of the upper electronics hanger (302).

In the preferred embodiment, the purpose of the receiver (172) is to induce from the axial electrical signal the receiver electrical signal in the receiver conductor (190). As a result, preferably the axial conducting loop (22) extends through the receiver coil (188) in order to maximize the exposure of the receiver coil (188) to the varying magnetic flux created by the axial electrical signal in the axial conducting loop (22). The receiver coil (188) may, however, be positioned at any location relative to the axial conducting loop (22) which results in exposure of the receiver coil (188) to the varying magnetic flux.

The preferred result is achieved in the preferred embodiment by the configuration of the components of the receiver sub (34). The proximal end (116) of the flex rotor extension (114) is supported in the receiver sub housing (156) by a slip ring bearing assembly. The slip ring bearing assembly comprises a slip ring bearing insert (310) which surrounds the flex rotor extension (114) adjacent to the proximal end (116) of the flex rotor extension (114) and a slip ring bearing retainer (312) which retains the slip ring bearing insert (310) in place.

The slip ring bearing insert (310) forms part of the second conductive connection (58) and houses a slip ring (314). The slip ring (314) maintains contact between the flex rotor extension (114) and the slip ring bearing insert (310) by rotatably cushioning the flex rotor extension (114) from vibration caused by rotation of drive train (78) components. The slip ring (314) is maintained snugly in position around the flex rotor extension (114), preferably by a coil spring (316) which biases the slip ring (314) radially outwards away from the flex rotor extension (114) and enables the slip ring (314) to adapt to radial movement of the flex rotor extension (114) caused by vibration of drive train (78) components.

The second inner axial conductor (212) of the axial conducting loop (22) includes the slip ring (314) and the slip ring bearing insert (310). As a result, the springs (316) assist in maintaining constant contact between the slip ring (314) and the flex rotor extension (114) so that the axial electrical signal can be conducted between the axial positions (48, 50) without significant energy loss.

In the preferred embodiment, the annular receiver space (194) is defined by the slip ring bearing insert (310) and the second axial position (50) is defined by the second conductive connection (58), which is a location of electrically conductive interface between the slip ring bearing insert (310) and the receiver sub housing (156). At the second conductive connection (58), the axial electrical signal is able to move between the slip ring bearing insert (310) and the receiver sub housing (156) without encountering significant resistance. In the preferred embodiment, the axial electrical signal is therefore conducted through the flex rotor extension (114), from the flex rotor extension (114) to the slip ring (314), from the slip ring (314) to the slip ring bearing insert (310) and from the slip ring bearing insert (310) to the receiver sub housing (156), with the result that the axial electrical signal passes through the interior of the receiver coil (188). The conductivity of the second conductive connection (58) is enhanced by the presence of a threaded connection between the slip ring bearing insert (310) and the receiver sub housing (156).

A short circuit of the axial electrical signal in the receiver sub (34) is prevented by providing electrical insulation between the flex rotor extension (114) and the receiver sub housing (156) between the distal end (154) of the receiver sub housing (156) and the location of the slip ring (314). In particular, electrical insulation is provided along the interface between the slip ring bearing retainer (312) and the receiver sub housing (156), along the interface between the slip ring bearing insert (310) and the receiver sub housing (156) up to the location of the slip ring (314). Any manner or type of electrical insulation may be provided along the interface. However, preferably, the insulation is comprised of a non-conductive coating applied to one or both of the inner surface of the receiver sub housing (156) and the outer surfaces of the slip ring bearing retainer (312) and slip ring bearing insert (310). Any non-conductive coating may be used. For instance, the non-conductive coating may be comprised of either an epoxy coating or a Teflon (trademark) coating. In the preferred embodiment, the coating is comprised of a high temperature epoxy.

The system of the present invention is therefore directed at providing an axial conducting loop (22) with minimal resistance which extends between the axial positions (48, 50) and which can conduct the axial electrical signal between the axial positions (48, 50) without significant energy losses due to short or open circuits or diverting of the axial electrical signal either to the formation or to the drilling mud or other fluids passing through the drill string during drilling operations.

In the preferred embodiment, the axial electrical signal is provided to the axial conducting loop (22) by the transmitter (170) which is electrically coupled to the axial conducting loop (22) by transformer coupling techniques, and the axial electrical signal is received by the receiver (172) which is also electrically coupled to the axial conducting loop (22) using transformer coupling techniques. In the preferred embodiment, the transmitter (170) and the receiver (172) are both transceivers and are constructed identically, with the exception of their specific mechanical configuration.

In the preferred embodiment, the axial conducting loop (22) is comprised of the first inner axial conductor (204) which is electrically connected with the second inner axial conductor (212), the second conductive connection (58), the second outer axial conductor (210) which is electrically connected with the first outer axial conductor (202) and the first conductive connection (56). Preferably, the first and second inner axial conductors (204, 212) and the first and second outer axial conductors (202, 210) are electrically insulated relative to each other between the conductive connections (56, 58) to minimize short circuits. In addition, the components making up the axial conductors (202, 204, 210, 212) are connected so as to minimize resistance between the components, also to minimize diverting of the axial electrical signal into the formation or the drilling fluids passing therethrough and to minimize energy losses. Finally, the conductive connections (56, 58) are also configured to minimize their resistance, again to minimize diverting of the axial electrical signal into the formation or the drilling fluids and to minimize energy losses.

The surface communication system (26) has a distal end (318) for connection with the upper end (30) of the drilling assembly (24) and a proximal end (320) for connection with the drill pipe (28). The surface communication system (26) may be comprised of any system or combination of systems which is capable of communicating with the receiver (172). In the preferred embodiment, the surface communication system (26) is a mud (drilling fluid) pressure pulse system, an acoustic system, a hard wired system or an electromagnetic system.

The drill string (20) may further include one or more lengths of tubular drill pipe (28) which extend from the proximal end (320) of the surface communication system (26) for at least a portion of the distance to the surface. In this instance, the receiver (172) may be located at the surface or at any location within or uphole of the drill pipe (28) such that the axial conducting loop extends through at least a portion of the drill pipe (28). Alternately, the drill pipe (28) may comprise a further or separate axial conducting loop (22). For instance, the axial conducting loop (22) described previously with respect to the drilling assembly (24) may comprise a first axial conducting loop, while the drill pipe (28), either alone or in combination with other components of the drill sting (20) above the drilling assembly (24), may comprise a second axial conducting loop (22).

Referring to FIGS. 4 and 5, the desired length of drill pipe (28) is comprised of at least one pipe section (322), and preferably a plurality of interconnected pipe sections (322), which may comprise a portion of an axial conducting loop (22). Any number of pipe sections (322) may be interconnected as necessary to extend the axial conducting loop (22) for the desired distance along the drill string (20). More particularly, the length of drill pipe (28) is comprised of a third outer axial conductor (324), a third inner axial conductor (326) and the electrical insulator (76). Thus, the outer axial conductor (54) described previously may be comprised of the third outer axial conductor (324) and the inner axial conductor (52) described previously may be comprised of the third inner axial conductor (326) such that at least a portion of the axial conducting loop (22) is comprised of the third outer axial conductor (324) and the third inner axial conductor (326).

Where the drill pipe (28) comprises a portion of the axial conducting loop (22) extending from the drilling assembly (24), the third outer axial conductor (324) is preferably electrically connected, either directly or indirectly and by any electrical connection mechanism, with the second outer axial conductor (210). Similarly, the third inner axial conductor (326) is preferably electrically connected, either directly or indirectly and by any electrical connection mechanism, with the second inner axial conductor (212).

In greater detail, the third outer axial conductor (324) defines the inner circumferential surface (60) which further defines the outer conductor longitudinal axis (62), particularly, a third outer conductor longitudinal axis (328). Similarly, the third inner axial conductor (326) defines the outer circumferential surface (64) which further defines the inner conductor longitudinal axis (66), particularly, a third inner conductor longitudinal axis (330). The third inner axial conductor (326) is fixedly connected within the third outer axial conductor (324) such that the annular space (68) is defined between the outer circumferential surface (64) and the inner circumferential surface (60) and such that the third outer conductor longitudinal axis (328) and the third inner conductor longitudinal axis (330) are substantially coincidental. As well, the electrical insulator (76) is disposed within the annular space (68). Finally, the third inner axial conductor (326) defines a portion of the fluid pathway (74) suitable for conducting a fluid therethrough.

In the preferred embodiment, the third outer axial conductor (324) is comprised of a conductive outer tubular member (332) or joint of the drill pipe (28). The third inner axial conductor (326) is comprised of a conductive inner tubular member (334) or mandrel which is fixedly connected within the outer tubular member (340). The inner tubular member (334) may be comprised of any conductive metal tube, however, the inner tubular member (334) is preferably comprised of 90/10 Copper/Nickel tubing which is relatively abrasion resistant and corrosion resistant.

The electrical insulator (76) is comprised of a layer of an electrically insulative material disposed within the annular space (68) between the outer tubular member (340) and the inner tubular member (342). Preferably, the electrical insulator (76) is comprised of an insulative coating of the electrically insulative material applied to at least one of the outer circumferential surface (64) of the inner tubular member (334) and the inner circumferential surface (60) of the outer tubular member (332). In the preferred embodiment, the electrical insulator (76) is a hardened epoxy resin.

Alternately, the third inner axial conductor (326) may be comprised of a layer of an electrically conductive material. More particularly, the third inner axial conductor (326) may be comprised of a conductive coating of the electrically conductive material applied to the electrical insulator (76). For example, the electrical insulator (76) may be comprised of an insulating ceramic base coating applied to the inner circumferential surface (60) of the outer tubular member (332). The third inner axial conductor (326) may then be comprised of a metal impregnated conductive ceramic coating applied to the insulating ceramic base coating. To form the third inner axial conductor (326), the metal particles are preferably mixed with the ceramic coating such that the metal particles have a sufficient concentration to provide a relatively reliable electrical path. Each of the ceramic coatings preferably provides resistance to erosion and wear during use.

Adjacent pipe sections (322) are preferably connected together to form the drill pipe (28) through a threaded connection. Specifically, each pipe section (322) is preferably comprised of a threaded box connector (338) at one end and a threaded pin connector (340) at the other end. Accordingly, to connect the pipe sections (322), the threaded box connector (338) of one pipe section (322) is engaged with the threaded pin connector (340) of an adjacent pipe section (322). When connecting the pipe sections (322), the electrical connection or contact between adjacent pipe sections (322) is preferably provided through the threads or threaded connection.

Specifically, when the drill pipe sections (322) are threaded together, the conductive outer tubular members (332) comprising the third outer axial conductor (324) are electrically connected by the engagement of the threaded portions (340, 342). The electrical connection of the conductive inner tubular members (334) comprising the third inner axial conductor (326) may be provided by any mechanism or device capable of electrically connecting the inner tubular members (334) while insulating the inner tubular members (334) from the outer tubular members (332) to prevent short circuiting of the axial electrical signal. Preferably, the electrical connection of the inner tubular members (334) is provided by a through bore connector (342). Any suitable through bore connector (342) may be provided.

Referring to FIG. 5, the through bore connector (342) is preferably comprised of a conductive inner connector ring (344) which is positioned within the fluid pathway (74) provided by the inner tubular members (334) between the adjacent ends of the pipe sections (322) to provide the electrical connection between the adjacent ends of the inner tubular members (334). Further, to enhance or facilitate the electrical connection, the through bore connector (342) is also preferably comprised of a spring (346) positioned between the adjacent ends of the inner tubular members (334).

The invention also includes a method for communicating information along a drill string (20) between the first axial position (48) and the second axial position (50). Preferably the method is performed using the system as previously described.

In a preferred embodiment of the method of the invention, information may be communicated in either direction between the transmitter (170) and the receiver (172) and both the transmitter (170) and the receiver (172) function as transceivers. The receiver (172) is therefore capable of providing a transmitter electrical signal and the transmitter (170) is capable of providing a receiver electrical signal depending upon the direction in which the information is being communicated. As a result, in the discussion of the method that follows, "transmitter electrical signal" is an electrical signal which is conducted by either the transmitter (170) or the receiver (172) when functioning as a transmitter, and "receiver electrical signal" is an electrical signal which is conducted by either the transmitter (170) or the receiver (172) when functioning as a receiver.

As previously described, the axial electrical signal may be any varying electrical signal which can be modulated to embody the information. In the preferred embodiment, the axial electrical signal is induced in the axial conducting loop (22) by the transmitter electrical signal. Preferably, the axial electrical signal is induced in the axial conducting loop (22) with the assistance of a "flyback effect" created in the transmitter coil (174). This flyback effect is achievable where the transmitter electrical signal is a square pulse signal which can produce a theoretically infinite rate of change of magnetic flux between pulses. The flyback effect creates a flyback voltage which is amplified in comparison with the voltage of the transmitter electrical signal.

In the preferred embodiment of the method of the invention, the magnitude of the flyback voltage is typically approximately 5 times the voltage of the transmitter electrical signal where a unipolar square pulse signal is used as the varying electrical signal for the transmitter electrical signal. The magnitude of the flyback effect will, however, depend upon the specific characteristics of the transmitter electrical signal and the transmitter coil (174).

Both unipolar and bipolar varying electrical signals can produce the flyback effect. However, the use of a unipolar signal tends to simplify the creation and application of the flyback effect. For example, with a unipolar varying electrical signal as the transmitter electrical signal, transformer coupling produces a bipolar axial electrical signal and a bipolar receiver electrical signal. Due to the change in current direction, the receiver (172) tends to develop a zero bias or offset. As a result, in the preferred embodiment the transmitter electrical signal is a unipolar square pulse signal so that the flyback effect can be created in a relatively simple manner. A unipolar signal may, however, create a hysteresis effect in the cores (178, 192) and should thus be used with care to avoid permanently magnetizing the cores (178, 192).

Although any frequency of varying electrical signal may be used in the performance of the method, preferably the transmitter electrical signal varies at a carrier frequency of between about 1 hertz and about 2 megahertz. More preferably the transmitter electrical signal varies at a carrier frequency of between about 10 kilohertz and about 2 megahertz. In the preferred embodiment the transmitter electrical signal varies at a carrier frequency of about 400 kilohertz.

The transmitter electrical signal may be modulated in any manner to embody the information. In the preferred embodiment, the transmitter electrical signal is a frequency modulated (FM) signal.

The cores (178, 192) of the coils (174, 188) may be any size or shape and may be wound with any number of windings. The cores (178, 192) and the coils (174, 188) may be the same or they may be different. Preferably, however, the transmitter coil (174) and the receiver coil (188) are wound with the transmitter conductor (176) and the receiver conductor (190) respectively to achieve a resonant frequency which is compatible with the wavelength (and thus the frequency) of the transmitter electrical signal.

In the preferred embodiment, the transmitter coil (174) and the receiver coil (188) are wound identically, but the specific number of windings on the cores (178, 192) will depend upon the size, shape and electromagnetic characteristics of the cores (178, 192) and upon the specific desired operating parameters of the transmitter (170), the receiver (172) and the axial conducting loop (22). As a result, it is not necessary that the coils (174, 188) have the same number of windings, particularly if the cores (178, 192) have different sizes or different electromagnetic characteristics.

In the preferred embodiment, the cores (178, 192) of the coils (174, 188) are approximately square in cross section and have a cross sectional area of about 400 square millimetres. The outer diameter of the cores (178, 192) is about 100 millimetres and the inner diameter of the cores (178, 192) is about 75 millimetres. The coils (174, 188) are each wound with the necessary number of windings required to achieve the desired resonant frequency, as discussed above and as measured by an impedance meter. However, in the preferred embodiment, each of the coils (174, 188) has about 125 windings.

Although any voltage may be used in the invention, the voltage of the transmitter electrical signal is limited by the choice of components and the power consumption. It is preferable to minimize power consumption and to minimize the size of the necessary power supplies (186, 200). Preferably, the voltage of the transmitter electrical signal is between about 2 volts (peak to peak) and about 10 volts (peak to peak). "Peak to peak" refers to the amount of variation of the voltage of the electrical signal. More preferably, the voltage of the transmitter electrical signal is about 5 volts (peak to peak). As stated, the flyback voltage is typically found to be approximately 5 times the voltage of the transmitter electrical signal. Thus, in the preferred embodiment, the flyback voltage is approximately 25 volts (peak to peak). In the preferred embodiment where the electrical signal is a unipolar varying electrical signal, the voltage is between about 2 volts (peak) and about 10 volts (peak).

Although any amount of electrical power may be used in the invention, the power output of the transmitter electrical signal is preferably minimized in order to minimize the power requirements of the system and thus the size of the transmitter power supply (186). In the preferred embodiment, each of the transmitter (170) and the receiver (172) are also capable of gathering information for communication between the axial positions (48, 50). As a result, in the preferred embodiment the transmitter power supply (186) serves to energize the transmitter (170) and any sensors (168) which provide information to the transmitter (170) for communication to the receiver (172), and the receiver power supply (200) serves to energize the receiver (172) and any sensors (186) which provide information to the receiver (172) for communication to the transmitter (170).

Preferably, the transmitter power supply (186) energizes the transmitter (170) and all of its associated sensors (168) and other components, while the receiver power supply (200) energizes the receiver (172) and all of its associated sensors (168) and other components. However, a separate power supply (not shown) may be provided for energizing any of the sensors (168) or components associated with one or both of the transmitter (170) and the receiver (172).

In the preferred embodiment, the transmitter power supply (186) includes one or more DC batteries which may be connected in series or parallel to achieve a desired voltage, current and power consumption for a transmitter electrical signal generated by the transmitter (170) and to energize any other functions which must be performed by the transmitter (170). Similarly, the receiver power supply (200) preferably includes one or more DC batteries which may be connected in series or parallel to achieve a desired voltage, current and power consumption for a receiver electrical signal generated by the receiver (172) and to energize any other functions which must be performed by the receiver (172).

The procedure for communicating information from the transmitter (170) to the receiver (172) during drilling operations according to a preferred embodiment of the invention is as follows.

First, information is obtained during drilling operations by the sensors (168) located in the drill bit (85). This information is gathered by the transmitter processor (182). An oscillator in the transmitter processor (182) creates a varying carrier signal at a frequency of about 400 kilohertz which carrier signal is modulated by the transmitter processor (182) using frequency modulation techniques to embody the information therein to form the transmitter electrical signal. Thus, the information is received from the sensors (168) and the transmitter electrical signal is generated therefrom.

Second, the transmitter electrical signal embodying the information is amplified by the transmitter amplifier (184) and the amplified transmitter electrical signal is conducted through the transmitter coil (174) via the transmitter conductor (176) so that the transmitter electrical signal passing through the transmitter coil (174) has a voltage of about 5 volts (peak to peak) and a power output of less than about 50 milliwatts.

Third, the transmitter electrical signal induces in the axial conducting loop (22) the conduct of the axial electrical signal embodying the information. At a frequency of about 400 kilohertz, the preferred voltage of the transmitter electrical signal of 5 volts (peak to peak) produces a flyback voltage of about 25 volts (peak to peak). Further, in the preferred embodiment, where the flyback voltage is about 25 volts (peak to peak) and the transmitter (170) has about 125 windings, an axial electrical signal is induced in the axial conducting loop (22) having a stepped down voltage but a stepped up current.

Fourth, the conduct of the axial electrical signal in the axial conducting loop (22) induces in the receiver coil (188) the conduct of the receiver electrical signal embodying the information. In the preferred embodiment, where the axial electrical signal has a voltage of about 0.2 volts (peak to peak) and the receiver (172) has about 125 windings, a receiver electrical signal is induced in the receiver (172) having a stepped up voltage of about 25 volts (peak to peak). This value is however dampened and attenuated by resistance in the axial conducting loop (22) and any short circuiting of the axial electrical signal across the inner and outer axial conductors (52, 54).

Fifth, the receiver electrical signal is amplified by the receiver amplifier (198) and the amplified receiver electrical signal is passed through the receiver processor (196) for processing, where the receiver electrical signal is demodulated to obtain the information from the receiver electrical signal.

The procedure for communicating information from the receiver (172) to the transmitter (170) during drilling operations according to the preferred embodiment of the invention is essentially the reverse of the procedure for communicating information from the transmitter (170) to the receiver (172), with the result that the transmitter (170) functions as a receiver and the receiver (172) functions as a transmitter.

The invention claimed is:

1. A telemetry system for communicating information axially along a drill string, the drill string being comprised of a drive train supported within a housing, the system comprising:
   (a) an axial conducting loop formed by the drill string for conducting an axial electrical signal embodying the information between a first axial position in the drill string and a second axial position in the drill string, which axial conducting loop extends between the first axial position and the second axial position; and
   (b) a transmitter for transmitting information to the axial conducting loop;
wherein the drive train is comprised of a downhole end, wherein the downhole end of the drive train extends from and is located below the housing, and wherein at least one of the first axial position and the second axial position is located in the downhole end of the drive train.

2. The system as claimed in claim 1 wherein the downhole end of the drive train is comprised of a drive shaft and wherein at least a portion of the axial conducting loop is comprised of the drive shaft.

3. The system as claimed in claim 1 wherein the downhole end of the drive train is comprised of a drill bit assembly and wherein at least a portion of the axial conducting loop is comprised of the drill bit assembly.

4. The system as claimed in claim 3 wherein one of the first axial position and the second axial position is located in the drill bit assembly.

5. The system as claimed in claim 1 wherein the drive train is rotatably supported within the housing.

6. The system as claimed in claim 1, further comprising at least one sensor located in the downhole end of the drive train, wherein the sensor provides information to the transmitter.

7. The system as claimed in claim 3, further comprising at least one sensor located in the drill bit assembly, wherein the sensor provides information to the transmitter.

8. The system as claimed in claim 6, further comprising a receiver for receiving the information from the axial conducting loop.

9. The system as claimed in claim 8 wherein the receiver is adapted to be electrically connected with a surface communication system in order that information from the sensor can be communicated by the surface communication system.

10. The system as claimed in claim 8 wherein the receiver and the transmitter are both transceivers which are capable of both transmitting and receiving the information.

11. The system as claimed in claim 1 wherein the downhole end of the drive train is comprised of:
   (a) a first outer axial conductor having an inner circumferential surface defining an outer conductor longitudinal axis;
   (b) a first inner axial conductor having an outer circumferential surface defining an inner conductor longitudinal axis, wherein the first inner axial conductor is fixedly connected within the first outer axial conductor such that an annular space is defined between the outer circumferential surface and the inner circumferential surface, wherein the outer conductor longitudinal axis and the inner conductor longitudinal axis are substantially coincidental and wherein at least a portion of the axial conducting loop is comprised of the first outer axial conductor and the first inner axial conductor; and
   (c) an electrical insulator disposed within the annular space.

12. The system as claimed in claim 11 wherein the first inner axial conductor defines a fluid pathway suitable for conducting a fluid therethrough.

13. The system as claimed in claim 11 wherein the electrical insulator is comprised of a layer of an electrically insulative material disposed within the annular space.

14. The system as claimed in claim 11 wherein a portion of the axial conducting loop is formed by the drill string above the downhole end of the drive train and wherein a portion of the axial conducting loop above the downhole end of the drive train is comprised of a second outer axial conductor comprised of the housing and a second inner axial conductor comprised of the drive train.

15. The system as claimed in claim 14 wherein the drive train is rotatably supported within the housing.

16. The system as claimed in claim 14 wherein the first outer axial conductor is electrically connected with the second outer axial conductor and wherein the first inner axial conductor is electrically connected with the second inner axial conductor.

17. The system as claimed in claim 1 wherein the transmitter is comprised of a transmitter conductor for conducting a transmitter electrical signal embodying the information such that conducting of the axial electrical signal in the axial conducting loop will be induced from the conducting of the transmitter electrical signal in the transmitter conductor.

18. The system as claimed in claim 8 wherein the receiver is comprised of a receiver conductor for conducting a receiver electrical signal embodying the information such that conducting of the receiver electrical signal in the receiver conductor will be induced from the conducting of the axial electrical signal in the axial conducting loop.

19. A method for communicating information axially along a drill string comprised of a drive train supported within a housing, the method comprising the step of conducting an axial electrical signal embodying the information between a first axial position in the drill string and a second axial position in the drill string through an axial conducting loop formed by the drill string, which axial conducting loop extends between the first axial position and the second axial position, wherein the drive train is comprised of a downhole end, wherein the downhole end of the drive train extends from and is located below the housing, and wherein at least one of the first axial position and the second axial position is located in the downhole end of the drive train.

20. The method as claimed in claim 19, further comprising the following steps:
   (a) conducting through a transmitter conductor a transmitter electrical signal embodying the information; and
   (b) inducing from the conducting of the transmitter electrical signal the conducting through the axial conducting loop of the axial electrical signal.

21. The method as claimed in claim 19, further comprising the step of inducing from the conducting of the axial electrical signal the conducting through a receiver conductor of a receiver electrical signal embodying the information.

22. The method as claimed in claim 20, further comprising the step of inducing from the conducting of the axial electrical signal the conducting through a receiver conductor of a receiver electrical signal embodying the information.

23. The method as claimed in claim 22, further comprising the following steps before conducting the transmitter electrical signal through the transmitter conductor:
   (a) receiving the information; and
   (b) generating the transmitter electrical signal.

24. The method as claimed in claim 23, further comprising the step after conducting the receiver electrical signal through the receiver conductor of obtaining the information from the receiver electrical signal.

25. The method as claimed in claim 24 wherein the transmitter conductor and the receiver conductor are located between the first axial position and the second axial position.

26. The method as claimed in claim 25 wherein the transmitter electrical signal is comprised of a varying electrical signal having a carrier frequency of between about 10 kilohertz and about 2 megahertz.

27. The method as claimed in claim 26 wherein the transmitter electrical signal has a voltage of between about 2 volts (peak) and about 10 volts (peak).

28. The method as claimed in claim 27 wherein the transmitter electrical signal is a unipolar varying electrical signal.

29. A telemetry system for communicating information axially along a drill string, the system comprising:
   (a) an axial conducting loop formed by the drill string for conducting an axial electrical signal embodying the information between a first axial position in the drill string and a second axial position in the drill string, which axial conducting loop extends between the first axial position and the second axial position;
   (b) at least a portion of the drill string between the first axial position and the second axial position comprising:
      (i) an outer axial conductor having an inner circumferential surface defining an outer conductor longitudinal axis;
      (ii) an inner axial conductor having an outer circumferential surface defining an inner conductor longitudinal axis, wherein the inner axial conductor is fixedly connected within the outer axial conductor such that an annular space is defined between the outer circumferential surface and the inner circumferential surface, wherein the outer conductor longitudinal axis and the inner conductor longitudinal axis are substantially coincidental and wherein at least a portion of the axial conducting loop is comprised of the outer axial conductor and the inner axial conductor; and
      (iii) an electrical insulator disposed within the annular space; and
   (c) a transmitter for transmitting information to the axial conducting loop.

30. The system as claimed in claim 29, further comprising a receiver for receiving the information from the axial conducting loop.

31. The system as claimed in claim 29 wherein the outer axial conductor is comprised of an outer tubular member.

32. The system as claimed in claim 29 wherein the electrical insulator is comprised of a layer of an electrically insulative material disposed within the annular space.

33. The system as claimed in claim 29 wherein the electrical insulator is comprised of an insulative coating of the electrically insulative material applied to at least one of the outer circumferential surface of the inner axial conductor and the inner circumferential surface of the outer axial conductor.

34. The system as claimed in claim 29 wherein the inner axial conductor defines a fluid pathway suitable for conducting a fluid therethrough.

35. The system as claimed in claim 29 wherein the inner axial conductor is comprised of an inner tubular member fixedly connected within the outer axial conductor.

36. The system as claimed in claim 30 wherein the drill string is comprised of a drive train supported within a housing.

37. The system as claimed in claim 36 wherein the drive train is comprised of a downhole end, wherein the downhole end of the drive train extends from and is located below the housing, and wherein at least one of the first axial position and the second axial position is located in the downhole end of the drive train.

38. The system as claimed in claim 37 wherein the downhole end of the drive train is comprised of:
   (a) a first outer axial conductor having an inner circumferential surface defining a first outer conductor longitudinal axis;
   (b) a first inner axial conductor having an outer circumferential surface defining a first inner conductor longitudinal axis, wherein the first inner axial conductor is fixedly connected within the first outer axial conductor such that an annular space is defined between the outer circumferential surface and the inner circumferential surface, wherein the first outer conductor longitudinal axis and the first inner conductor longitudinal axis are substantially coincidental, wherein the outer axial conductor is comprised of the first outer axial conductor, and wherein the inner axial conductor is comprised of the first inner axial conductor, such that at least a portion of the axial conducting loop is comprised of the first outer axial conductor and the first inner axial conductor; and
   (c) an electrical insulator disposed within the annular space.

39. The system as claimed in claim 38 wherein the first inner axial conductor defines a fluid pathway suitable for conducting a fluid therethrough.

40. The system as claimed in claim 38 wherein the electrical insulator is comprised of a layer of an electrically insulative material disposed within the annular space.

41. The system as claimed in claim 38 wherein the electrical insulator is comprised of an insulative coating of the electrically insulative material applied to at least one of the outer circumferential surface of the inner axial conductor and the inner circumferential surface of the outer axial conductor.

42. The system as claimed in claim 38 wherein a portion of the axial conducting loop is formed by the drill string above the downhole end of the drive train and wherein a portion of the axial conducting loop above the downhole end of the drive train is comprised of a second outer axial conductor comprised of the housing and a second inner axial conductor comprised of the drive train.

43. The system as claimed in claim 42 wherein the drive train is rotatably supported within the housing.

44. The system as claimed in claim 42 wherein the first outer axial conductor is electrically connected with the second outer axial conductor and wherein the first inner axial conductor is electrically connected with the second inner axial conductor.

45. The system as claimed in claim 42 wherein the first inner axial conductor defines a fluid pathway suitable for conducting a fluid therethrough.

46. The system as claimed in claim 42 wherein the electrical insulator is comprised of a layer of an electrically insulative material disposed within the annular space.

47. The system as claimed in claim 42 wherein the electrical insulator is comprised of an insulative coating of the electrically insulative material applied to at least one of the outer circumferential surface of the inner axial conductor and the inner circumferential surface of the outer axial conductor.

48. The system as claimed in claim 30 wherein the drill string is comprised of a length of tubular drill pipe and wherein the length of drill pipe is comprised of:
    (a) a third outer axial conductor having an inner circumferential surface defining a third outer conductor longitudinal axis;
    (b) a third inner axial conductor having an outer circumferential surface defining a third inner conductor longitudinal axis, wherein the third inner axial conductor is fixedly connected within the third outer axial conductor such that an annular space is defined between the outer circumferential surface and the inner circumferential surface, wherein the third outer conductor longitudinal axis and the third inner conductor longitudinal axis are substantially coincidental, wherein the outer axial conductor is comprised of the third outer axial conductor, and wherein the inner axial conductor is comprised of the third inner axial conductor, such that at least a portion of the axial conducting loop is comprised of the third outer axial conductor and the third inner axial conductor; and
    (c) an electrical insulator disposed within the annular space.

49. The system as claimed in claim 48 wherein the third inner axial conductor defines a fluid pathway suitable for conducting a fluid therethrough.

50. The system as claimed in claim 48 wherein the electrical insulator is comprised of a layer of an electrically insulative material disposed within the annular space.

51. The system as claimed in claim 48 wherein the electrical insulator is comprised of an insulative coating of the electrically insulative material applied to at least one of the outer circumferential surface of the inner axial conductor and the inner circumferential surface of the outer axial conductor.

52. The system as claimed in claim 48 wherein the drill string is further comprised of a drive train supported within a housing and wherein the length of drill pipe is located above the housing.

53. The system as claimed in claim 52 wherein a portion of the axial conducting loop is comprised of a second outer axial conductor comprised of the housing and a second inner axial conductor comprised of the drive train.

54. The system as claimed in claim 53 wherein the drive train is rotatably supported within the housing.

55. The system as claimed in claim 53 wherein the third outer axial conductor is electrically connected with the second outer axial conductor and wherein the third inner axial conductor is electrically connected with the second inner axial conductor.

56. The system as claimed in claim 53 wherein the third inner axial conductor defines a fluid pathway suitable for conducting a fluid therethrough.

57. The system as claimed in claim 53 wherein the electrical insulator is comprised of a layer of an electrically insulative material disposed within the annular space.

58. The system as claimed in claim 53 wherein the electrical insulator is comprised of an insulative coating of the electrically insulative material applied to at least one of the outer circumferential surface of the inner axial conductor and the inner circumferential surface of the outer axial conductor.

59. The system as claimed in claim 53 wherein the drive train is comprised of a downhole end, wherein the downhole end of the drive train extends from and is located below the housing, and wherein at least one of the first axial position and the second axial position is located in the downhole end of the drive train.

60. The system as claimed in claim 59 wherein the downhole end of the drive train is comprised of:
    (a) a first outer axial conductor having an inner circumferential surface defining a first outer conductor longitudinal axis;
    (b) a first inner axial conductor having an outer circumferential surface defining a first inner conductor longitudinal axis, wherein the first inner axial conductor is fixedly connected within the first outer axial conductor such that an annular space is defined between the outer circumferential surface and the inner circumferential surface, wherein the first outer conductor longitudinal axis and the first inner conductor longitudinal axis are substantially coincidental, wherein the outer axial conductor is comprised of the first outer axial conductor, and wherein the inner axial conductor is comprised of the first inner axial conductor, such that at least a portion of the axial conducting loop is comprised of the first outer axial conductor and the first inner axial conductor; and
    (c) an electrical insulator disposed within the annular space.

61. The system as claimed in claim 60 wherein the drive train is rotatably supported within the housing.

62. The system as claimed in claim 60 wherein the first outer axial conductor is electrically connected with the second outer axial conductor and wherein the first inner axial conductor is electrically connected with the second inner axial conductor.

63. The system as claimed in claim 62 wherein the third outer axial conductor is electrically connected with the second outer axial conductor and wherein the third inner axial conductor is electrically connected with the second inner axial conductor.

64. The system as claimed in claim 60 wherein the downhole end of the drive train defines a fluid pathway suitable for conducting a fluid therethrough.

65. The system as claimed in claim 60 wherein the electrical insulator is comprised of a layer of an electrically insulative material disposed within the annular space.

66. The system as claimed in claim 60 wherein the electrical insulator is comprised of an insulative coating of the electrically insulative material applied to at least one of the outer circumferential surface of the inner axial conductor and the inner circumferential surface of the outer axial conductor.

* * * * *